(12) United States Patent
Parhi et al.

(10) Patent No.: US 7,334,200 B2
(45) Date of Patent: *Feb. 19, 2008

(54) LOW-ERROR FIXED-WIDTH MODIFIED BOOTH MULTIPLIER

(75) Inventors: Keshab K. Parhi, Mission Viejo, CA (US); Jin-Gyun Chung, Jeonju (KR); Kwang-Cheol Lee, Jeonju (KR); Kyung-Ju Cho, Kimie (KR)

(73) Assignee: Broadcom Corporation, Irvine, CA (US)

(*) Notice: Subject to any disclaimer, the term of this patent is extended or adjusted under 35 U.S.C. 154(b) by 67 days.

This patent is subject to a terminal disclaimer.

(21) Appl. No.: 11/062,456

(22) Filed: Feb. 22, 2005

(65) Prior Publication Data

US 2005/0144217 A1 Jun. 30, 2005

Related U.S. Application Data

(63) Continuation of application No. 10/231,179, filed on Aug. 30, 2002, now Pat. No. 6,978,426.

(60) Provisional application No. 60/371,149, filed on Apr. 10, 2002.

(51) Int. Cl.
*G06F 17/50* (2006.01)
*G06F 7/52* (2006.01)

(52) U.S. Cl. ............... 716/1; 708/628; 708/629; 708/630

(58) Field of Classification Search ............ 716/1–2; 708/628–630

See application file for complete search history.

(56) References Cited

U.S. PATENT DOCUMENTS

| 4,813,008 A | 3/1989 | Shingehara et al. |
| 4,825,401 A | 4/1989 | Ikumi |
| 4,866,715 A | 9/1989 | Van Meerbergen et al. |
| 4,910,701 A | 3/1990 | Gibbons et al. |
| 5,473,559 A | 12/1995 | Makino |
| 5,703,802 A | 12/1997 | Tsubata et al. |
| 5,796,644 A | 8/1998 | Jiang |
| 5,796,645 A | 8/1998 | Peh et al. |
| 5,867,415 A | 2/1999 | Makino |

(Continued)

OTHER PUBLICATIONS

S. S. Kidambi, F. El-Guibaly, and A. Antoniou; "Area-Efficient Multipliers for Digital Signal Processing Applications"; *IEEE Transactions on Circuits and Systems -II*; vol. 43, No. 2, pp. 90-95; IEEE (Feb. 1996).

(Continued)

*Primary Examiner*—Paul Dinh
*Assistant Examiner*—Suresh Memula
(74) *Attorney, Agent, or Firm*—Sterne, Kessler, Goldstein & Fox PLLC

(57) ABSTRACT

A low-error fixed-width multiplier receives a W-bit input and produces a W-bit product. In an embodiment, a multiplier (Y) is encoded using modified Booth coding. The encoded multiplier (Y) and a multiplicand (X) are processed together to generate partial products. The partial products are accumulated to generate a product (P). To compensate for the quantization error, Booth encoder outputs are used for the generation of error compensation bias. The truncated bits are divided into two groups, a major least significant bit group and a minor least significant bit group, depending upon their effects on the quantization error. Different error compensation methods are applied to each group.

15 Claims, 35 Drawing Sheets

U.S. PATENT DOCUMENTS

| | | | |
|---|---|---|---|
| 5,909,385 | A | 6/1999 | Nishiyama et al. |
| 5,928,316 | A | 7/1999 | Wong et al. |
| 6,066,178 | A | 5/2000 | Bair et al. |
| 6,173,304 | B1 | 1/2001 | Goldovsky et al. |
| 6,240,438 | B1 | 5/2001 | Goto |
| 2001/0023425 | A1* | 9/2001 | Oberman et al. ........... 708/620 |

OTHER PUBLICATIONS

J. M. Jou and S. R. Kuang; "Design of low-error fixed-width multiplier for DSP applications;" *Electronics Letters*; vol. 33, No. 19, pp. 1597-1598; The IEEE (Sep. 1997).

L.-D. Van, S.-S. Wang, and W.-S. Feng; "Design of the Lower Error Fixed-Width Multiplier and Its Application;" *IEEE Transactions on Circuits and Systems II*; vol. 47, No. 10, pp. 1112-1118; IEEE (Oct. 2000).

S.-J. Jou and H- H. Wang; "Fixed-Width Multiplier for DSP Application"; *Proceedings of 2000 ICCD*; pp. 318-322; IEEE (Sep. 2000).

O. L. MacSorley, "High-Speed Arithmetic in Binary Computers;" *Proc. IRE*; vol. 49, No. 1, pp. 67-91; The Institute of Radio Engineers, Inc. (Jan. 1961).

C. J. Nicol and P. Larsson; "Low-Power Multiplication for FIR Filters;" *Proceedings of IEEE International Symposium on Low Power Electronics and Design*; pp. 76-79; IEEE (Aug. 1997).

Lan-Da Van et al., Design of the Lower Error Fixed-Width Multiplier and its Application, IEEE Transactions on Circuits and Systems II, pp. 1112-1118, Oct. 2000.

K. J. Cho et al., Low Error Fixed-Width Modified Booth Multiplier, IEEE Workshop on Signal Processing Systems, pp. 45-50, Oct. 2002.

Jer Min Jou et al., Desing of Low-Error Fixed Width Multipliers for DSP Applications, IEEE Transactions on Circuits and Systems II, pp. 836-842, Jun. 1999.

Lan-Da Van et al., A Generalized Methodology for Lower-Error Area-Efficient Fixed-Width Multipliers, IEEE International Symposium on Circuits and Systems, pp. 1-65-1-68, May 2002.

Lan-Da Van et al., Design of a Lower-Error Fixed-Width Multiplier for Speech Processing Application, Proceedings of the 1999 IEEE International Symposium on Circuits and Systems, pp. 130-133, Jun. 1999.

* cited by examiner

TABLE I
MODIFIED BOOTH CODING TABLE

| $y_{2i+1}$ | $y_{2i}$ | $y_{2i-1}$ | $y'_i$ | $X_{sel}$ | $2X_{sel}$ | NEG |
|---|---|---|---|---|---|---|
| 0 | 0 | 0 | 0 | 0 | 0 | 0 |
| 0 | 0 | 1 | 1 | 1 | 0 | 0 |
| 0 | 1 | 0 | 1 | 1 | 0 | 0 |
| 0 | 1 | 1 | 2 | 0 | 1 | 0 |
| 1 | 0 | 0 | -2 | 0 | 1 | 1 |
| 1 | 0 | 1 | -1 | 1 | 0 | 1 |
| 1 | 1 | 0 | -1 | 1 | 0 | 1 |
| 1 | 1 | 1 | 0 | 0 | 0 | 1 |

FIG.2

TABLE II

PARTIAL PRODUCT FOR EACH ENCODED $y'_i$ WITH $W = 8$

| $y'_i$ | $p'_{i,8}$ | $p_{i,7}$ | $p_{i,6}$ | $p_{i,5}$ | $p_{i,4}$ | $p_{i,3}$ | $p_{i,2}$ | $p_{i,1}$ | $p_{i,0}$ | $n_{i,0}$ |
|---|---|---|---|---|---|---|---|---|---|---|
| 0 | 0 | 0 | 0 | 0 | 0 | 0 | 0 | 0 | 0 | 0 |
| 1 | $x_7$ | $x_7$ | $x_6$ | $x_5$ | $x_4$ | $x_3$ | $x_2$ | $x_1$ | $x_0$ | 0 |
| -1 | $\bar{x}_7$ | $\bar{x}_7$ | $\bar{x}_6$ | $\bar{x}_5$ | $\bar{x}_4$ | $\bar{x}_3$ | $\bar{x}_2$ | $\bar{x}_1$ | $\bar{x}_0$ | 1 |
| 2 | $x_7$ | $x_6$ | $x_5$ | $x_4$ | $x_3$ | $x_2$ | $x_1$ | $x_0$ | 0 | 0 |
| -2 | $\bar{x}_7$ | $\bar{x}_6$ | $\bar{x}_5$ | $\bar{x}_4$ | $\bar{x}_3$ | $\bar{x}_2$ | $\bar{x}_1$ | $\bar{x}_0$ | 1 | 1 |

FIG.5

| 0 | 1 | 2 | 3 | 4 | 5 | 6 | 7 | 8 | 9 | 10 | 11 | 12 | 13 | 14 |
|---|---|---|---|---|---|---|---|---|---|----|----|----|----|----|
|   |   |   |   |   |   |   |   |   |   |    |    |    |    | $n_{0,0}$ |
|   |   |   |   |   |   | $P_{0,8}$ | $P_{0,7}$ | $P_{0,6}$ | $P_{0,5}$ | $P_{0,4}$ | $P_{0,3}$ | $P_{0,2}$ | $P_{0,1}$ | $P_{0,0}$ |
|   |   |   |   |   |   |   |   |   |   |    |    | $n_{1,0}$ |   |   |
|   |   |   |   | $P_{1,8}$ | $P_{1,7}$ | $P_{1,6}$ | $P_{1,5}$ | $P_{1,4}$ | $P_{1,3}$ | $P_{1,2}$ | $P_{1,1}$ | $P_{1,0}$ |   |   |
|   |   |   |   |   |   |   |   |   |   | $n_{2,0}$ |   |   |   |   |
|   |   | $P_{2,8}$ | $P_{2,7}$ | $P_{2,6}$ | $P_{2,5}$ | $P_{2,4}$ | $P_{2,3}$ | $P_{2,2}$ | $P_{2,1}$ | $P_{2,0}$ |   |   |   |   |
|   |   |   |   |   |   |   |   | $n_{3,0}$ |   |   |   |   |   |   |
| $P_{3,8}$ | $P_{3,7}$ | $P_{3,6}$ | $P_{3,5}$ | $P_{3,4}$ | $P_{3,3}$ | $P_{3,2}$ | $P_{3,1}$ | $P_{3,0}$ |   |    |    |    |    |    |

FIG. 6

TABLE III
PARTIAL PRODUCT BITS FOR ALL THE POSSIBLE CASES
(PP/$\alpha\beta$ MEANS PP FOR $x_j x_{j-1} = \alpha\beta$ IN FIG.7)

| $y_{2i+1}$ | $y_{2i}$ | $y_{2i-1}$ | PP/00 | PP/01 | PP/10 | PP/11 |
|---|---|---|---|---|---|---|
| 0 | 0 | 0 | 0 | 0 | 0 | 0 |
| 0 | 0 | 1 | 0 | 0 | 1 | 1 |
| 0 | 1 | 0 | 0 | 0 | 1 | 1 |
| 0 | 1 | 1 | 0 | 1 | 0 | 1 |
| 1 | 0 | 0 | 1 | 0 | 1 | 0 |
| 1 | 0 | 1 | 1 | 1 | 0 | 0 |
| 1 | 1 | 0 | 1 | 1 | 0 | 0 |
| 1 | 1 | 1 | 1 | 1 | 1 | 1 |

FIG.8

TABLE IV
MODIFIED BOOTH CODING FOR 8-BIT NUMBERS WITH
AT LEAST ONE NONZERO BIT IN THE MOST SIGNIFICANT
3 BIT POSITIONS

| 8-BIT NUMBER | CODED NUMBER |
|---|---|
| 0 0 1 \| 0 0 0 0 0 (0) | 1 $\bar{2}$ 0 0 |
| 0 1 0 \| 0 0 0 0 0 (0) | 1 0 0 0 |
| 0 1 1 \| 0 0 0 0 0 (0) | 2 $\bar{2}$ 0 0 |
| 1 0 0 \| 0 0 0 0 0 (0) | $\bar{2}$ 0 0 0 |
| 1 0 1 \| 0 0 0 0 0 (0) | $\bar{1}$ $\bar{2}$ 0 0 |
| 1 1 0 \| 0 0 0 0 0 (0) | $\bar{1}$ 0 0 0 |
| 1 1 1 \| 0 0 0 0 0 (0) | 0 $\bar{2}$ 0 0 |

FIG.11

| ⓪ | ① | ② | ③ | ④ | ⑤ | ⑥ | ⑦ | ⑧ | ⑨ | ⑩ | ⑪ | ⑫ | ⑬ | ⑭ |
|---|---|---|---|---|---|---|---|---|---|---|---|---|---|---|
| | $y'_3$ | $y'_2$ | $y'_1$ | $y'_0$ | = 0 0 0 1 | $x_7$ | $x_7$ | $x_6$ | $x_5$ | $x_4$ | $x_3$ | $x_2$ | $x_1$ | $x_0$ |
| | $y'_3$ | $y'_2$ | $y'_1$ | $y'_0$ | = 0 0 0 $\bar{1}$ | $\bar{x}_7$ | $\bar{x}_7$ | $\bar{x}_6$ | $\bar{x}_5$ | $\bar{x}_4$ | $\bar{x}_3$ | $\bar{x}_2$ | $\bar{x}_1$ | 1 $\bar{x}_0$ |
| | $y'_3$ | $y'_2$ | $y'_1$ | $y'_0$ | = 0 0 0 $\bar{2}$ | $\bar{x}_7$ | $\bar{x}_6$ | $\bar{x}_5$ | $\bar{x}_4$ | $\bar{x}_3$ | $\bar{x}_2$ | $\bar{x}_1$ | $\bar{x}_0$ | 1 1 |

| TABLE V ROUNDED VALUE OF $E[LP'_{minor}]$ FOR $W=10$ ||
|---|---|
| $y''_3\, y''_2\, y''_1\, y''_0$ ( # OF CASES) | $\{E[LP'_{minor}]\}_r$ ( # OF CASES) |
| 0 0 0 0  (4) | 0 (4) |
| 0 0 0 1  (12) | 0 (4),  1 (8) |
| 0 0 1 0  (12) | 0 (4),  1 (8) |
| 0 0 1 1  (36) | 1 (36) |
| 0 1 0 0  (12) | 0 (4),  1 (8) |
| 0 1 0 1  (36) | 1 (36) |
| 0 1 1 0  (36) | 1 (36) |
| 0 1 1 1  (108) | 1 (52),  2 (56) |
| 1 0 0 0  (12) | 0 (4),  1 (8) |
| 1 0 0 1  (36) | 1 (36) |
| 1 0 1 0  (36) | 1 (36) |
| 1 0 1 1  (108) | 1 (52),  2 (56) |
| 1 1 0 0  (36) | 1 (36) |
| 1 1 0 1  (108) | 1 (52),  2 (56) |
| 1 1 1 0  (108) | 1 (52),  2 (56) |
| 1 1 1 1  (324) | 2 (324) |

FIG. 13

TABLE VI
REPRESENTATION OF APPROXIMATE CARRY VALUES

| ROUNDED VALUE | a_CARRY_0 | a_CARRY_1 |
|---|---|---|
| 0 | 0 | 0 |
| 1 | 1 | 0 |
| 2 | 1 | 1 |

FIG.14

|  $y_3'' y_2''$ \ $y_1'' y_0''$ | 00 | 01 | 11 | 10 |
|---|---|---|---|---|
| 00 |  |  |  |  |
| 01 |  |  | X |  |
| 11 |  | X | 1 | X |
| 10 |  |  | X |  | a_CARRY_1

FIG.15B

| $y_3'' y_2''$ \ $y_1'' y_0''$ | 00 | 01 | 11 | 10 |
|---|---|---|---|---|
| 00 |  |  |  |  |
| 01 |  |  | 1 |  |
| 11 |  | 1 | 1 | 1 |
| 10 |  |  | 1 |  | a_CARRY_1

FIG.16B

TABLE VII
COMPARISON OF THE AVERAGE AND THE VARIANCE OF ABSOLUTE
ERROR FOR VARIOUS QUANTIZATION SCHEMES FOR W=10

|  | AVERAGE | VARIANCE |
|---|---|---|
| ROUNDED TO 10 BIT FROM IDEAL PRODUCT | $4.8733 \times 10^{-4}$ | $7.9937 \times 10^{-8}$ |
| TRUNCATED TO 10 BIT FROM IDEAL PRODUCT | $9.6607 \times 10^{-4}$ | $3.1696 \times 10^{-7}$ |
| $\sigma_{Jou}$ | $12.1514 \times 10^{-4}$ | $8.2146 \times 10^{-6}$ |
| $\sigma_{INVENTION}$ | $6.2841 \times 10^{-4}$ | $1.9412 \times 10^{-7}$ |

FIG. 19

TABLE VIII
COMPARISON OF THE NORMALIZED AVERAGE AND VARIANCE OF ABSOLUTE
ERROR FOR VARIOUS QUANTIZATION SCHEMES FOR $W=10$

|  | AVERAGE | VARIANCE |
|---|---|---|
| ROUNDED TO 10 BIT FROM IDEAL PRODUCT | 1 | 1 |
| TRUNCATED TO 10 BIT FROM IDEAL PRODUCT | 1.9824 | 3.9651 |
| $\sigma_{Van}$ | 2.4433 | 102.7634 |
| $\sigma_{INVENTION}$ | 1.2895 | 2.4284 |

FIG. 20

TABLE IX
APPROXIMATE CARRY VALUES FOR W=12

| $y_4'' y_3'' y_2'' y_1'' y_0''$ | a_carry_2 | a_carry_1 | a_carry_0 |
|---|---|---|---|
| 0 0 0 0 0 | 0 | 0 | 0 |
| 0 0 0 0 1 | 0 | 0 | 1 |
| 0 0 0 1 0 | 0 | 0 | 1 |
| 0 0 0 1 1 | 0 | 0 | 1 |
| 0 0 1 0 0 | 0 | 0 | 1 |
| 0 0 1 0 1 | 0 | 0 | 1 |
| 0 0 1 1 0 | 0 | 0 | 1 |
| 0 0 1 1 1 | 0 | 1 | 1 |
| 0 1 0 0 0 | 0 | 0 | 1 |
| 0 1 0 0 1 | 0 | 0 | 1 |
| 0 1 0 1 0 | 0 | 0 | 1 |
| 0 1 0 1 1 | 0 | 1 | 1 |
| 0 1 1 0 0 | 0 | 0 | 1 |
| 0 1 1 0 1 | 0 | 1 | 1 |
| 0 1 1 1 0 | 0 | 1 | 1 |
| 0 1 1 1 1 | 0 | 1 | 1 |
| 1 0 0 0 0 | 0 | 0 | 1 |
| 1 0 0 0 1 | 0 | 0 | 1 |
| 1 0 0 1 0 | 0 | 0 | 1 |
| 1 0 0 1 1 | 0 | 1 | 1 |
| 1 0 1 0 0 | 0 | 0 | 1 |
| 1 0 1 0 1 | 0 | 1 | 1 |
| 1 0 1 1 0 | 0 | 1 | 1 |
| 1 0 1 1 1 | 0 | 1 | 1 |
| 1 1 0 0 0 | 0 | 0 | 1 |
| 1 1 0 0 1 | 0 | 1 | 1 |
| 1 1 0 1 0 | 0 | 1 | 1 |
| 1 1 0 1 1 | 0 | 1 | 1 |
| 1 1 1 0 0 | 0 | 1 | 1 |
| 1 1 1 0 1 | 0 | 1 | 1 |
| 1 1 1 1 0 | 0 | 1 | 1 |
| 1 1 1 1 1 | 1 | 1 | 1 |

FIG.22

TABLE X
COMPARISON OF THE AVERAGE AND THE VARIANCE OF ABSOLUTE ERROR FOR VARIOUS QUANTIZATION SCHEMES FOR $W=12$

|  | AVERAGE | VARIANCE |
|---|---|---|
| ROUNDED TO 12 BIT FROM IDEAL PRODUCT | $1.2201 \times 10^{-4}$ | $4.9743 \times 10^{-9}$ |
| TRUNCATED TO 12 BIT FROM IDEAL PRODUCT | $2.4337 \times 10^{-4}$ | $1.9854 \times 10^{-8}$ |
| $\sigma_{Jou}$ | $3.1561 \times 10^{-4}$ | $5.2085 \times 10^{-7}$ |
| $\sigma_{INVENTION}$ | $1.6276 \times 10^{-4}$ | $1.3271 \times 10^{-8}$ |

FIG.23

TABLE XI
COMPARISON OF THE AVERAGE AND THE VARIANCE OF ABSOLUTE
ERROR FOR VARIOUS QUANTIZATION SCHEMES FOR W=16

|  | AVERAGE | VARIANCE |
|---|---|---|
| ROUNDED TO 16 BIT FROM IDEAL PRODUCT | $7.5124 \times 10^{-6}$ | $1.9530 \times 10^{-9}$ |
| TRUNCATED TO 16 BIT FROM IDEAL PRODUCT | $1.4784 \times 10^{-5}$ | $7.9612 \times 10^{-11}$ |
| $\sigma_{Jou}$ | $1.9211 \times 10^{-5}$ | $1.9174 \times 10^{-10}$ |
| $\sigma_{INVENTION}$ | $1.0726 \times 10^{-5}$ | $6.3770 \times 10^{-11}$ |

FIG.24

TABLE XII
COMPARISON OF THE AVERAGE AND THE VARIANCE OF ABSOLUTE
ERROR FOR VARIOUS QUANTIZATION SCHEMES FOR $W=20$

| | AVERAGE | VARIANCE |
|---|---|---|
| ROUNDED TO 20 BIT FROM IDEAL PRODUCT | $4.6291 \times 10^{-7}$ | $8.0798 \times 10^{-14}$ |
| TRUNCATED TO 20 BIT FROM IDEAL PRODUCT | $9.0232 \times 10^{-7}$ | $3.2101 \times 10^{-13}$ |
| $\sigma_{Jou}$ | $1.1480 \times 10^{-6}$ | $8.2452 \times 10^{-13}$ |
| $\sigma_{INVENTION}$ | $6.3497 \times 10^{-7}$ | $2.4399 \times 10^{-13}$ |

FIG.25

TABLE XIII
SYNOPSYS SIMULATION RESULTS FOR W=10

|  | AREA | POWER($\mu$W) |
|---|---|---|
| IDEAL | 811 (100%) | 1246.3 (100%) |
| FIXED BY Jou + Wang | 501 (61.8%) | 761.1 (61.0%) |
| FIXED BY INVENTION | 506 (62.4%) | 781.8 (62.7%) |

FIG.26

TABLE XIV
SYNOPSYS SIMULATION RESULTS FOR W=12

|  | AREA | POWER (mW) |
|---|---|---|
| IDEAL | 1079 (100%) | 1.6429 (100%) |
| FIXED BY Jou + Wang | 682 (63.2%) | 1.0440 (63.6%) |
| FIXED BY INVENTION | 717 (66.5%) | 1.0658 (64.9%) |

FIG.27

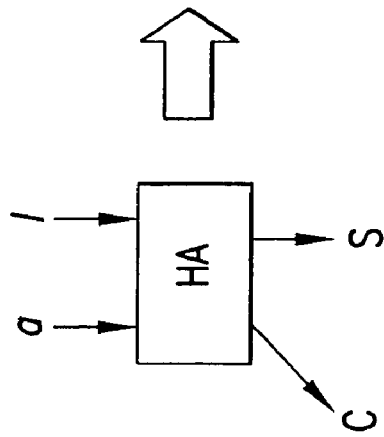
FIG.29B
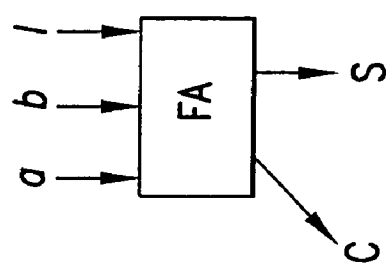
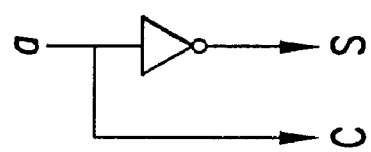
FIG.29A
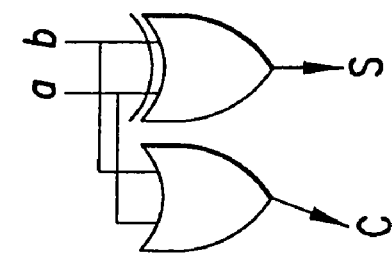

TABLE XV
APPROXIMATE CARRY SIGNALS GENERATED BY ACGP I AND II

| $y_2'' y_1'' y_0''$ | ACGP I | | ACGP II | |
|---|---|---|---|---|
| | a_CARRY_0 | a_CARRY_1 | a_CARRY_0 | a_CARRY_1 |
| 0 0 0 | 0 | 0 | 0 | 0 |
| 0 0 1 | 1 | 0 | 0 | 1 |
| 0 1 0 | 1 | 0 | 0 | 1 |
| 0 1 1 | 1 | 0 | 1 | 0 |
| 1 0 0 | 1 | 0 | 0 | 1 |
| 1 0 1 | 1 | 0 | 1 | 0 |
| 1 1 0 | 1 | 0 | 1 | 0 |
| 1 1 1 | 1 | 1 | 1 | 1 |

FIG.30

TABLE XVI
COMPARISON OF ACGPI AND II

| W | COMPUTATION TIME (ns) (ACGPI / ACGPII) | AREA (ACGPI / ACGPII) |
|---|---|---|
| 10 | 4.48 / 6.21 | 10/11 |
| 12 | 7.21 / 6.06 | 22/15 |
| 14 | 7.94 / 6.21 | 31/20 |
| 16 | 10.25 / 7.56 | 43/23 |

FIG.32

LOW-ERROR FIXED-WIDTH MODIFIED BOOTH MULTIPLIER

CROSS-REFERENCE TO RELATED APPLICATIONS

This application is a continuation of U.S. application Ser. No. 10/231,179, filed Aug. 30, 2002, which claims the benefit of U.S. Provisional Application No. 60/371,149, filed Apr. 10, 2002, each of which is incorporated herein by reference in its entirety.

FIELD OF THE INVENTION

The present invention relates to data processing. More particularly, it relates to fixed-width multiplication of data.

BACKGROUND OF THE INVENTION

In many multimedia and digital signal processing (DSP) applications, for example, multiplication operations have a fixed-width property. This property means that input data and output results for multiplication operations have the same bit width. In order to implement this fixed-width property, in many multimedia and DSP applications the "2W-1" bit product obtained from a W-bit multiplicand and a W-bit multiplier is quantized to W-bits by eliminating the "W-1" least-significant bits.

In typical fixed-width multipliers, which are used to implement the fixed-width property, the adder cells required for the computation of the "W-1" least-significant bits are omitted and biases are introduced into the retained adder cells. Several conventional fixed-width multiplier schemes and/or designs such as, for example, Baugh-Wooley multipliers or parallel array multipliers exist. (See, e.g., S. S. Kidambi et al., "Area-efficient multipliers for digital signal processing applications," *IEEE Trans. Circuits Syst. II*, vol. 43, pp. 90-94 (February 1996); J. M. Jou and S. R. Kuang, "Design of a low-error fixed-width multiplier for DSP applications," *Electron. Lett.*, vol. 33, no. 19, pp. 1597-1598 (1997); L. D. Van et al., "Design of the lower error fixed-width multiplier and its applications," *IEEE Trans. Circuits Syst. II*, vol. 47, pp. 1112-1118 (October 2000); and S. J. Jou and H. H. Wang, "Fixed-width multiplier for DSP application," in *Proceedings of 2000 ICCD* (Austin, Tex.), pp. 318-322 (September 2000); each of which is incorporated herein in its entirety.)

Each of the conventional fixed-width multiplier schemes and/or designs, however, introduces errors into the multiplication output results, which for certain applications are significant. For example, Kidambi et al. relates to a constant bias scheme wherein a constant bias is added to the retained cells. This constant bias scheme cannot be adjusted adaptively by the input signals, however, and the resulting truncation error is typically large. In Jou and Kuang and in Van et al., error compensation biases are generated using an indexing scheme. The indices used in these schemes attempt to incorporate the effects of the input signals and thus are an improvement over Kidambi et al. However, although quantization errors may be reduced by using indices, these schemes still have limitations that introduce errors into the multiplication output results, which for certain applications are significant. In Jou and Wang, statistical analysis and linear regression analysis are used to generate a bias that is added to retained adder cells. This scheme, however, also introduces errors into the multiplication output results, which for certain applications are significant. Thus, there is a need for new schemes and/or designs that do not have the limitations of the conventional schemes and/or designs.

What is needed is a new lower-error fixed-width multiplier, and a method for designing the same, that overcomes the limitations of the conventional fixed-width multiplier schemes and/or designs.

BRIEF SUMMARY OF THE INVENTION

A fixed-width multiplier receives a W-bit input and produces a W-bit product. In an embodiment, a multiplier (Y) is encoded using modified Booth coding. The encoded multiplier (Y) and a multiplicand (X) are processed together to generate partial products. The partial products are accumulated to generate a product (P). To compensate for the quantization error, Booth encoder outputs are used for the generation of error compensation bias. The truncated bits are divided into two groups, a major least significant bit group and a minor least significant group, depending upon their effects on the quantization error. Different error compensation methods are applied to each group.

In embodiments of the invention, fixed-width modified Booth multiplication is accomplished as follows. A W-bit multiplier is encoded using modified Booth coding. The encoded multiplier and a multiplicand are process to generate partial products. The partial products are accumulated to generate a W-bit product. This accumulation is achieved by dividing truncated bits into two groups, a major least significant bit group and a minor least significant bit group. An approximate carry value is generated using the bits of the minor least significant bit group. An exact carry value for the major least significant bit group is generated using the approximate carry value and the bits of the major least significant bit group.

In one embodiment, an output of a Booth encoder is used to generate the approximate carry value. In another embodiment, a plurality of adder circuit carry signals are used to generate the approximate carry value.

In embodiments, several adder circuits are used to accumulate more than W most significant bits, and the resultant product is truncated or rounded to form a W-bit product or longer-than-W-bit product.

In some embodiments of the invention, fixed-width modified Booth multiplication is accomplished in accordance with the following steps. A modified Booth encoded multiplier and a multiplicand are processed to generate at least a first group of N partial products and a second group of N partial products. Each partial product of the first and second groups of N partial products is associated with a most significant bit group, a major least significant bit group, or a minor least significant bit group. An approximate carry value is generated for the minor least significant bit group. An exact carry value is generated for the major least significant bit group using the approximate carry value and the value of each partial product associated with the major least significant bit group. A product is generated for the most significant bit group using the exact carry value and the value of each partial product associated with the most significant bit group.

In embodiments, a fixed-width modified Booth multiplier according to the invention includes a module that encodes a W-bit multiplier using modified Booth coding, a module that processes the encoded multiplier and a multiplicand to generate partial products, and a module that accumulates the partial products to generate a W-bit product. The module that accumulates the partial products includes means for associating truncated bits with a major least significant bit group or a minor least significant bit group, means for generating an approximate carry value using the bits associated with the minor least significant bit group, and means for generating an exact carry value using the approximate carry value and the bits associated with the major least significant bit group.

In embodiments, a fixed-width multiplier according to the invention includes a modified Booth encoder circuit and a partial product generation circuit. In one embodiment, a plurality of digital logic circuits are used to generate the approximated carry value. In an embodiment, a plurality of adder circuits are used to generate the approximated carry value.

In one aspect of the invention, the following method steps are used to design fixed-width multipliers according to embodiments of the invention. A plurality of partial products formed for a W-bit multiplier and a W-bit multiplicand during modified Booth multiplication are identified. Each of these partial products is associated with a most significant bit group, a major least significant bit group, or a minor least significant bit group. A circuit is designed that generates an approximate carry value based on partial product values of the partial products associated with the minor least significant bit group. A circuit is designed that generates an exact carry value based on partial product values of the partial products associated with the major least significant bit group and an output of the circuit that generates an approximate carry value. A circuit is designed that generates a product value based on partial product values of the partial products associated with the most significant bit group and an output of the circuit that generates an exact carry value.

In embodiments, the design step of designing a circuit that generates an approximate carry value is performed as follows. A plurality of coded values $y''_{w/2-2}, y''_{w/2-3}, \ldots, y''_1$ and $y''_0$ are formed. A number ($N_{AC}$) of approximate carry signals (a_carry_0, a_carry_1, ..., a_carry_$N_{AC-1}$) to be generated by an approximate carry generation circuit is selected. A value of 1 is assigned to an approximate carry signal (a_carry_i) if at least "2i+1" of the coded values $y''_{w/2-2}, y''_{w/2-3}, \ldots, y''_1$ and $y''_0$ have a value of 1. A circuit design technique is applied to the assigned values of the approximate carry signals (a_carry_0, a_carry_1, ..., a_carry_$N_{AC-1}$) to design the approximate carry generation circuit. In one embodiment, this step involves applying a Karnaugh map design technique.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The present invention is described with reference to the accompanying figures. In the figures, like reference numbers indicate identical or functionally similar elements. Additionally, the left-most digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

FIG. 2 is a table illustrating modified Booth coding according to an embodiment of the invention.

FIG. 5 is a Table illustrating example partial products according to an embodiment of the invention.

FIG. 6 illustrates how to add partial products according to an embodiment of the invention.

FIG. 8 is a Table illustrating partial product bits according to an embodiment of the invention.

FIG. 11 is a Table illustrating modified Booth coding according to an embodiment of the invention.

FIG. 12 illustrates three different partial products for three coded words according to an embodiment of the invention.

FIG. 13 is a Table illustrating rounded values according to an embodiment of the invention.

FIG. 14 is a Table illustrating approximate carry values according to an embodiment of the invention.

FIG. 15B is Karnaugh map representation for an approximate carry value according to an embodiment of the invention.

FIG. 16B is Karnaugh map representation for an approximate carry value according to an embodiment of the invention.

FIG. 19 is a Table illustrating a comparison of the performance of various quantization schemes.

FIG. 20 is a Table illustrating a comparison of the normalized performance of various quantization schemes.

FIG. 22 is a Table illustrating approximate carry values according to an embodiment of the invention.

FIG. 23 is a Table illustrating a comparison of the performance of various quantization schemes.

FIG. 24 is a Table illustrating a comparison of the performance of various quantization schemes.

FIG. 25 is a Table illustrating a comparison of the performance of various quantization schemes.

FIG. 26 is a Table illustrating Synopsys results for an embodiment of the invention and a conventional modified Booth multiplier system.

FIG. 27 is a Table illustrating Synopsys results for an embodiment of the invention and a conventional modified Booth multiplier system.

FIG. 29A illustrates an example half adder circuit according to an embodiment of the invention.

FIG. 29B illustrates an example full adder circuit according to an embodiment of the invention.

FIG. 30 illustrates a comparison of approximate carry signals generated in accordance with two embodiments of the invention.

FIG. 32 illustrates a comparison of Synopsys simulation results in accordance with two embodiments of the invention.

DETAILED DESCRIPTION OF THE INVENTION

Introduction

The present invention provides an efficient, low-error, fixed-width modified Booth multiplier and a method for designing the same.

In embodiments, a multiplier (Y) is encoded using modified Booth coding. The encoded multiplier (Y) and a multiplicand (X) are processed together to generate partial products. The bits of the generated partial products are divided into three groups, a most significant bit group, a major least significant bit group, and a minor least significant bit group. The bits of the minor least significant bit group are used to generate a first bias (an approximate carry value). This first bias and the bits of the major least significant bit group are used to generate a second bias (an exact carry value). In embodiments, different error compensation methods are applied to the bits of the minor least significant bit group and the bits of the major least significant bit group to generate the first bias and the second bias. The second bias and the bits of the most significant bit group are used to generate a fixed-width product (P).

In embodiments, Booth encoder outputs are used for the generation of a compensation bias rather than, for example, multiplier coefficients. This allows efficient compensation for the quantization error with reduced hardware complexity. Simulation results show that significant reductions in truncation error are achieved using the present invention in comparison to conventional fixed-width multipliers such as, for example, the fixed-width modified Booth multiplier described in Jou and Wang. (See Jou and Wang, "Fixed-width multiplier for DSP application," in *Proceedings of 2000 ICCD* (Austin, Tex.), pp. 318-322 (September 2000)).

The present invention will now be described in detail with reference to the accompanying figures.

Modified Booth Multiplier

In accordance with the present invention, the acceleration of the process of multiplication is based on two main techniques. The first technique is reducing the number of the partial products. The second technique is accelerating the summation of the partial products. Modified Booth coding is one of the most widely used techniques for reducing the number of partial products. (See MacSorley, O. L., "High speed arithmetic in binary computers," *Proc. IRE*, vol. 49, pp. 67-91 (January 1961), which is incorporated by reference herein in its entirety.)

Figure 1:
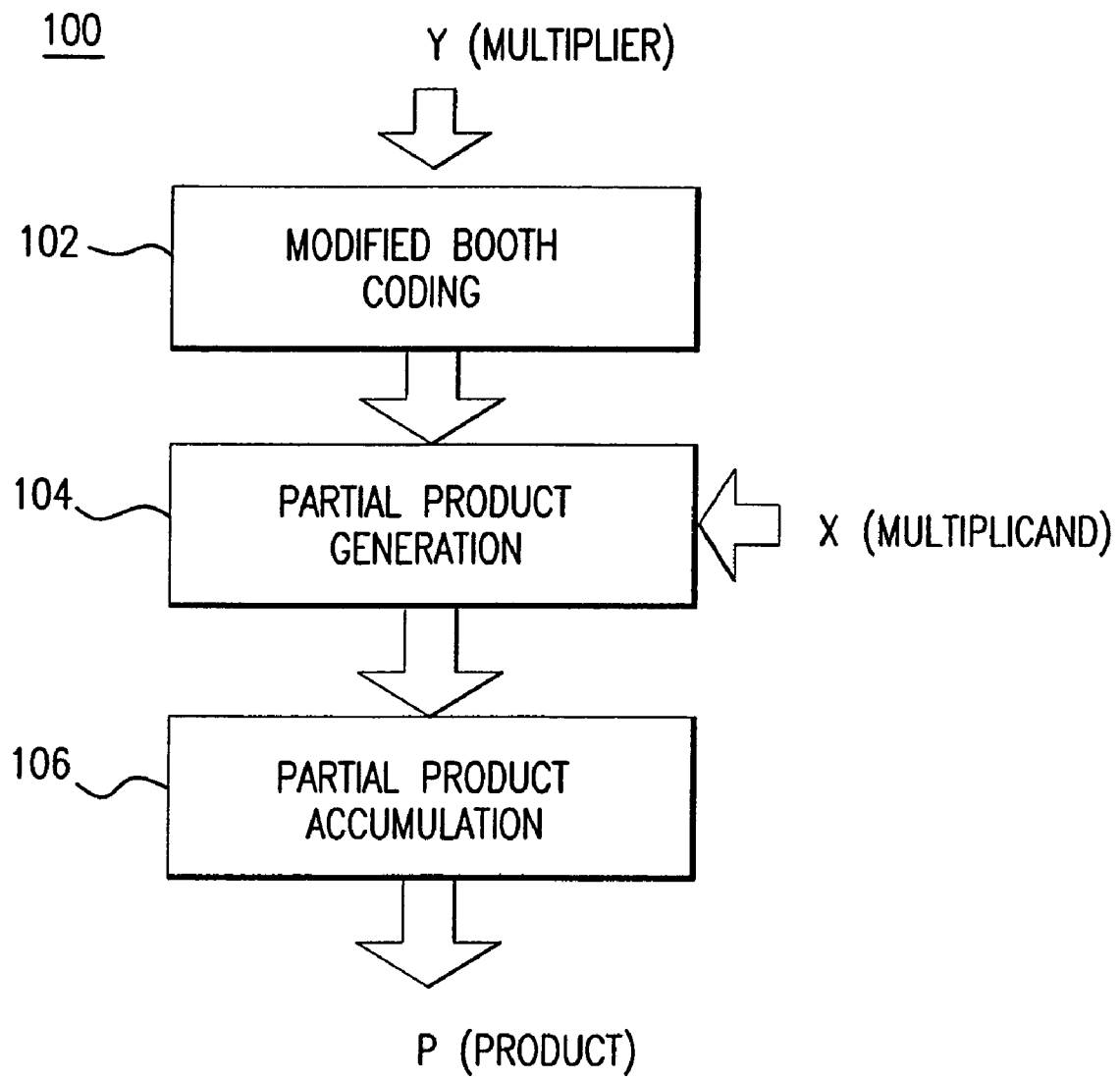
FIG. 1 illustrates a flowchart of the steps of a method for modified Booth multiplication according to an embodiment of the invention.

FIG. 1 is a flowchart of the steps of a method 100 according to the present invention that illustrates the operation of a modified Booth multiplier. In embodiments, method 100 operates as follows. In step 102 of method 100, a multiplier (Y) is encoded using modified Booth coding. This encoding involves appending a zero bit to a two's complement representation of the multiplier (Y). In step 104, the encoded multiplier (Y) and a multiplicand (X) are processed together to generate partial products. This processing involves adding and/or subtracting multiples of the multiplicand (X) to a sum of partial products and right-shifting the result. In embodiments, these operations can be performed using an encoder circuit and a partial product generation circuit. In step 106, the partial products generated in step 104 are accumulated according to the present invention to generate a product (P).

An advantage of method 100 compared to other multiplication methods is that fewer partial products are generated in step 104 than would otherwise be generated. To better understand the operation of a modified Booth multiplier, consider the multiplication of two 2's complement W-bit numbers X and Y, wherein X and Y are given by EQ. (1).

$$X = -x_{w-1} + \sum_{i=1}^{W-1} x_{w-1-i} 2^{-i},$$

$$Y = -y_{w-1} + \sum_{i=1}^{W-1} y_{w-1-i} 2^{-i}, \quad \text{EQ. (1)}$$

For modified Booth coding, '0' must always be concatenated to the right of Y, and W should be even. By modified Booth coding, Y is expressed as:

$$Y = \sum_{i=0}^{W/2-1} y'_{w/2-1-i} 2^{-(2i+1)}, \quad \text{EQ. (2)}$$

where $$y'_i = -2y_{2i+1} + y_{2i} + y_{2i-1}. \quad \text{EQ. (3)}$$

Table I in FIG. 2 summarizes the coding operation of EQ. (3).

Figure 3:
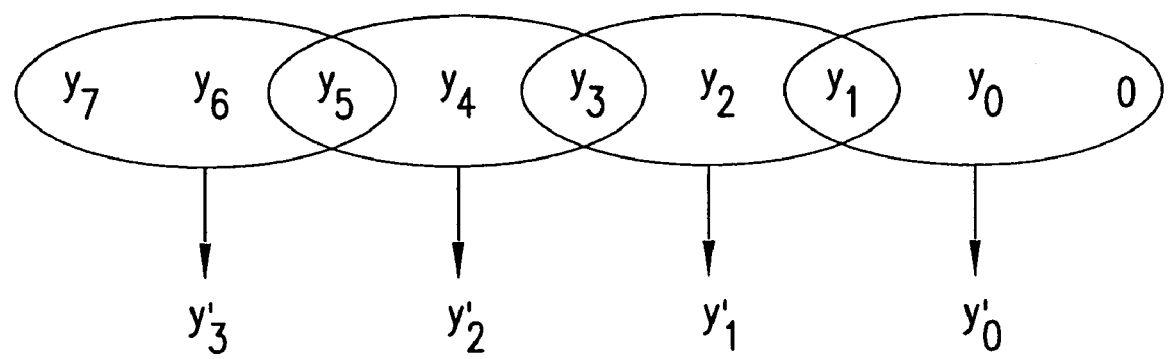
FIG. 3 illustrates an example grouping of bits for a modifier Booth encoder.
Figure 4:
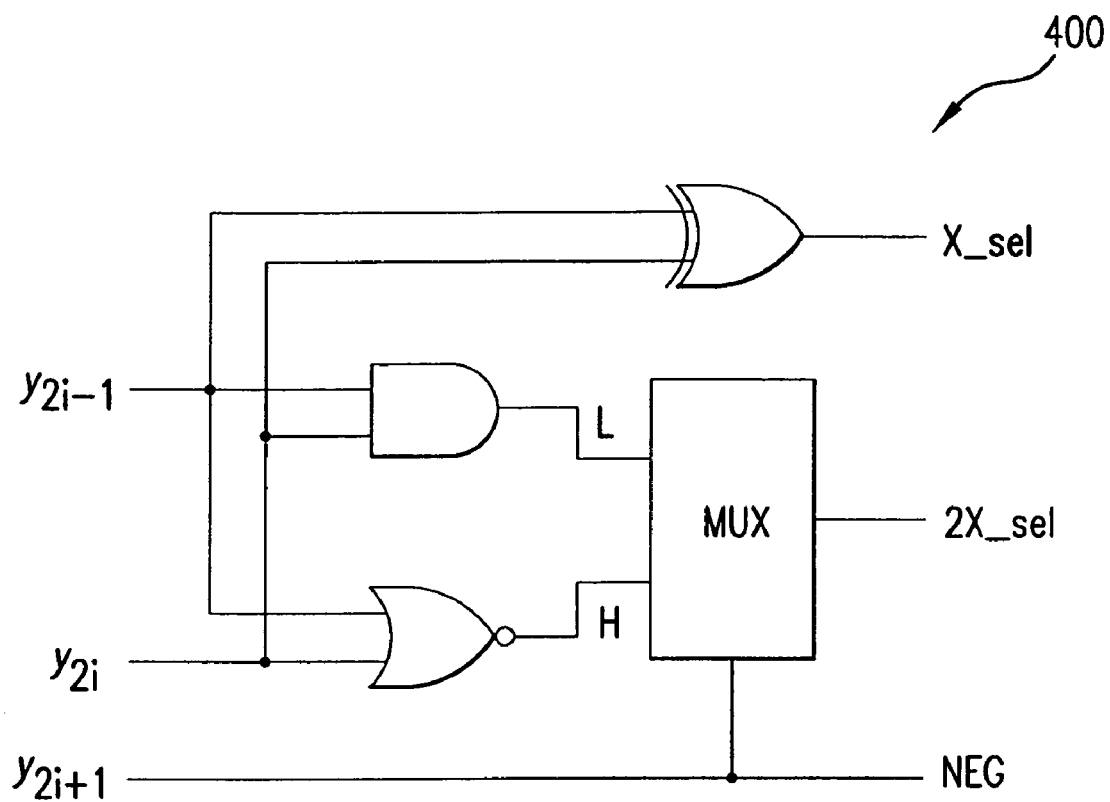
FIG. 4 illustrates an example encoder circuit for a modifier Booth encoder.

FIG. 3 and FIG. 4 illustrate a simple modified Booth encoder. FIG. 3 illustrates a grouping of multiplier bits for "W" equal to 8. FIG. 4 illustrates an example encoder circuit 400. An example encoder circuit having low-power consumption is described in Nicol and Larsson. (See Nicol, C. J. and Larsson, P., "A low-power multiplication for FIR filters," in *Proceedings of IEEE Int. Symp. Low Power Electronic and Design*, (Monterey, Calif.), pp. 76-79, (August 1997), which is incorporated by reference herein in its entirety.)

Figure 7:
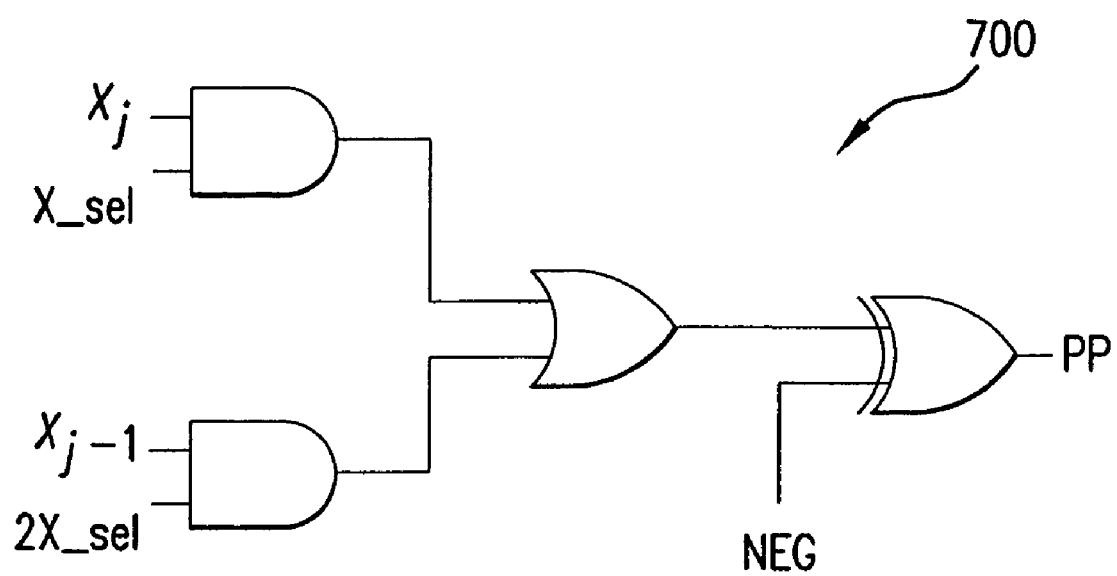
FIG. 7 illustrates an example partial product generation circuit according to an embodiment of the invention.

For "W" equal to 8, Table II in FIG. 5 illustrates the partial product corresponding to each encoded $y'_i$. FIG. 6 and FIG. 7 show the partial products and a partial product generation circuit 700, respectively.

Using Table I (see FIG. 2) and the partial product generation circuit 700 in FIG. 7, the partial product bits for all the possible combinations of $x_i$'s and $y_i$'s can be obtained as shown in Table III in FIG. 8.

Fixed-Width Multiplier

Figure 9:
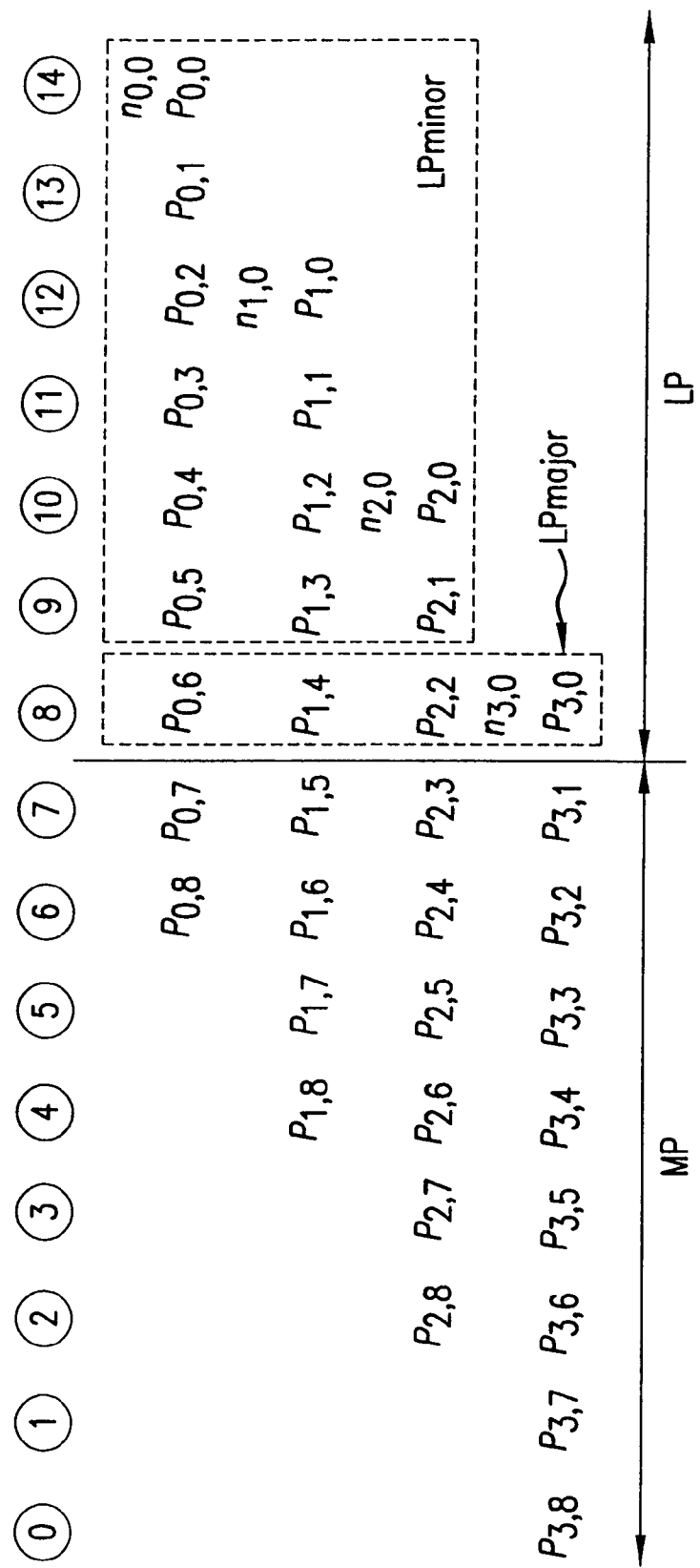
FIG. 9 illustrates a grouping of partial product bits according to an embodiment of the invention.

In accordance with the present invention, partial products for a modified Booth multiplier can be divided into most significant products (MP) and least significant products (LP) as shown in FIG. 9. This division facilitates accelerating the summation of the partial products generated in step 104 of method 100. As noted above, accelerating the summation of partial products is a second technique used for acceleration of the process of multiplication.

In order to generate error compensation biases more efficiently, LP is further subdivided into $LP_{major}$ and $LP_{minor}$ as shown in FIG. 9. This allows a (2W-1)-bit ideal product $P_I$ to be expressed as:

$$P_I = S\_MP + S\_LP, \qquad \text{EQ. (4)}$$

where $$S\_MP = \sum_{2W-2 \geq 2i+j \geq W-1} p_{i,j} 2^{-(2W-2-2i-j)}, \text{ and} \qquad \text{EQ. (5)}$$

$$S\_LP = \sum_{W-1 \geq 2i+j \geq 0} p_{i,j} 2^{-(2W-2-2i-j)} + \sum_{i=0}^{W/2-1} n_{i,0} 2^{-(2W-2-2i)} \qquad \text{EQ. (6)}$$

Notice that S_MP and S_LP represents the sum of the elements in MP and LP, respectively.

As is the case with typical fixed-width multipliers, in embodiments, the adder cells required for S_LP are omitted and appropriate biases are introduced to the retained adder cells based on a probabilistic estimation. Thus, the W-bit quantized product $P_Q$ can be expressed as:

$$PQ = S\_MP + \sigma \times 2^{-(W-1)}, \qquad \text{EQ. (7)}$$

where $\Phi$, represents the error-compensation bias. Notice that $\Phi$ approximates the carry signals propagated from LP to MP.

In Jou and Wang, an error compensation bias is defined using a statistical analysis as the sum of the elements in $LP_{major}$. For example, for a modified Booth multiplier with W equal to 8, $\Phi_{jou}$ is computed as:

$$\sigma_{jou} = p_{0,6} + p_{1,4} + p_{2,2} + p_{3,0} + n_{3,0}. \qquad \text{EQ. (8)}$$

Error Compensation Method

As shown in FIG. 9, S_LP can be expressed as:

$$S\_LP = S\_LP_{major} + S\_LP_{minor} \qquad \text{EQ. (9)}$$

If S_LP' is defined as:

$$S\_LP' = S\_LP \times 2W, \qquad \text{EQ. (10)}$$

$S\_LP'_{major}$ and $S\_LP'_{minor}$ can be expressed as:

$$S\_LP'_{major} = p_{0,6} + p_{1,4} + p_{2,2} + p_{3,0} + n_{3,0}. \qquad \text{EQ. (11)}$$

and $$S\_LP'_{minor} = 2^{-1}(p_{0,5} + p_{1,3} + p_{2,1}) + \qquad \text{EQ. (12)}$$
$$2^{-2}(p_{0,4} + p_{1,2} + p_{2,0} + n_{2,0}) +$$
$$2^{-3}(p_{0,3} + p_{1,1}) + 2^{-4}(p_{0,2} + p_{1,0} + n_{1,0}) +$$
$$2^{-5}(p_{0,1}) + 2^{-6}(p_{0,0} + n_{0,0}).$$

Notice that $LP_{major}$ has dominant effect on the carry signals generated from the LP part since $LP_{major}$ has the largest weight in the LP part. In embodiments, to simplify the error compensation circuit, each element in $LP_{minor}$ is assumed as a random variable.

Figure 10:
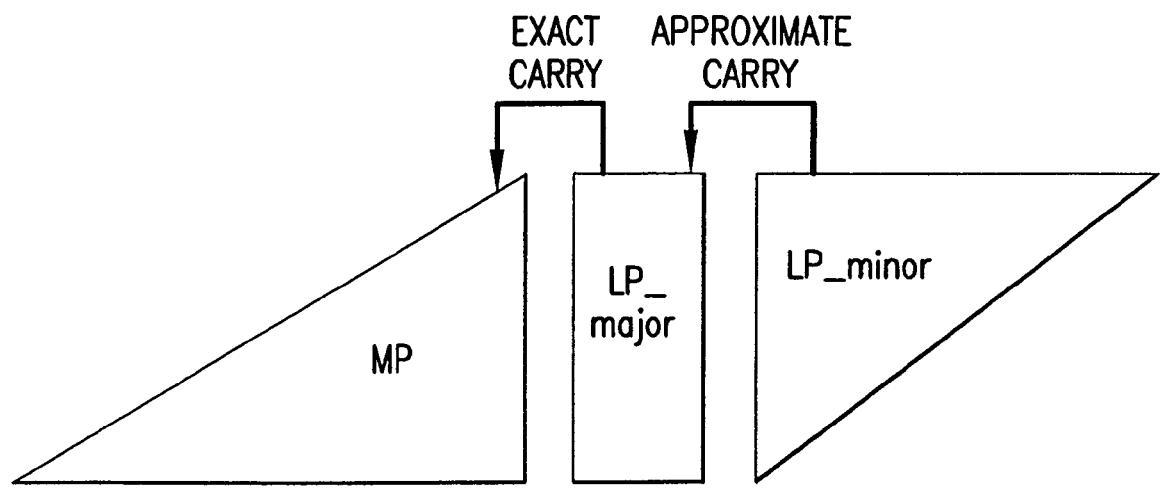
FIG. 10 illustrates an example fixed-width modified Booth multiplier structure according to an embodiment of the invention.

A fixed-width modified Booth multiplier structure according to the invention is illustrated in FIG. 10. The error compensation bias is given by EQ. (13):

$$\sigma_{prop} = CE[S\_LP'_{major} + C_A[S\_LP'_{minor}]], \qquad \text{EQ. (13)}$$

where $C_E[t]$ represents the exact carry value of t and $C_A[t]$ represents the approximate carry value of t. Notice that, in EQ. (13), $C_A[S\_LP'_{minor}]$ computes an approximate carry value from $LP_{minor}$ to $LP_{major}$. $C_A[t]$ is described in more detail below.

In accordance with embodiments of the invention, an error compensation bias is obtained as follows:
1. Divide LP into $LP_{major}$ and $LP_{minor}$.
2. Compute the approximate carry value from $LP_{minor}$.
3. Add the approximate carry value to $S\_LP'_{major}$.

The carry value obtained from the addition in step 3 is the desired error compensation bias.

Approximate Carry Generation

In this section, two approximate carry generation methods are described. Following the descriptions of these methods, a generalized approximate carry generation method is presented.

Approximate Carry Generation by Exhaustive Simulation

For the description that follows, consider a value $y''_i$, where $y''_i$ is defined as:

$$y''_i = \begin{cases} 1, & \text{if } y'_i \neq 0, \\ 0, & \text{otherwise.} \end{cases} \qquad \text{EQ. (14)}$$

From Table I (see FIG. 2), it can be shown that $y''_i$ is computed as:

$$y''_i = X_{i\_sel} \vee 2X_{i\_sel}, \qquad \text{EQ. (15)}$$

where v means OR operation. For example, if $y''_3 y''_2 y''_1 y''_0$ for a coded number $y'_3 y'_2 y'_1 y'_0$ is 1000, the coded number should have one of the following four values: 1000, 2000, $\overline{1}$0000, and $\overline{2}$000.

Table IV in FIG. 11 shows modified Booth coding for 8-bit numbers that have at least one nonzero bit in the most significant 3-bit positions. From Table IV, it is concluded that there are only three 8-bit numbers which can have $y''_3 y''_2 y''_1 y''_0 = 1000$ (i.e., 01000000(0), 10000000(0), and 11000000(0)). As another example, it can be shown that only the following three 8-bit numbers can have $y''_3 y''_2 y''_1 y''_0 = 0001$:

$$00000001(0) \rightarrow y'_3 y'_2 y'_1 y'_0 = 0001,$$

$$11111110(0) \rightarrow y'_3 y'_2 y'_1 y'_0 = 000\overline{2},$$

$$11111111(0) \rightarrow y'_3 y'_2 y'_1 y'_0 = 000\overline{1}. \qquad \text{EQ. (16)}$$

FIG. 12 illustrates the partial products for the three multiplier coefficients corresponding to $y''_3y''_2y''_1y''_0=0001$. If it is assumed that each bit of input X has a uniform probability distribution, the expected value of $x_i$ is:

$$E[x_i]=\tfrac{1}{2}.\qquad\text{EQ. (17)}$$

Thus, the rounded value of $E[S\_LP'_{minor}]$ for each of the three cases in FIG. 12 can be computed as follows:

$$\{E[S\_LP'_{minor}]\}_r = \begin{cases} 0, & \text{for } y'_3y'_2y'_1y'_0 = 0001 \\ 1, & \text{for } y'_3y'_2y'_1y'_0 = 000\overline{1}, 000\overline{2}, \end{cases}\qquad\text{EQ. (18)}$$

where $[t]_r$ means a rounding operation for t.

Notice that $E[S\_LP'_{minor}]$ is always zero for the three numbers with $y''_3y''_2y''_1y''_0=1000$. In other words, $y'_3$ does not have any effect on $E[S\_LP'_{minor}]$ since no element of the partial product corresponding to $y'_3$ is included in $LP_{minor}$ as can be seen from FIG. 9.

From the above description, it follows that the value of $E[S\_LP'_{minor}]$ is determined by coded multiplier coefficients. In accordance with the invention, to determine error compensation biases more accurately, $\{E[S\_LP'_{minor}]\}_r$ is computed for each $y''_{W/2-2}y''_{W/2-3}\cdots y''_0$.

An approximate carry generation circuit can be designed based on the computed $\{E[S\_LP'_{minor}]\}_r$ values. This procedure is further described using the following example.

EXAMPLE 1

Consider a modified Booth multiplication with W=10. Since, for W=10, $$E[S\_LP'_{minor}]=2^{-1}(y''_3+y''_2+y''_1+y''_0),\qquad\text{EQ. (18)}$$

the maximum rounded value of $E[S\_LP'_{minor}]$ is 2. Table V in FIG. 13 shows the rounded values of $E[S\_LP'_{minor}]$ for all the possible values of $y''_3y''_2y''_1y''_0$. Notice that $y''_4$ is not shown in Table V since it does not have any effect on $E[S\_LP'_{minor}]$.

Figure 15A:
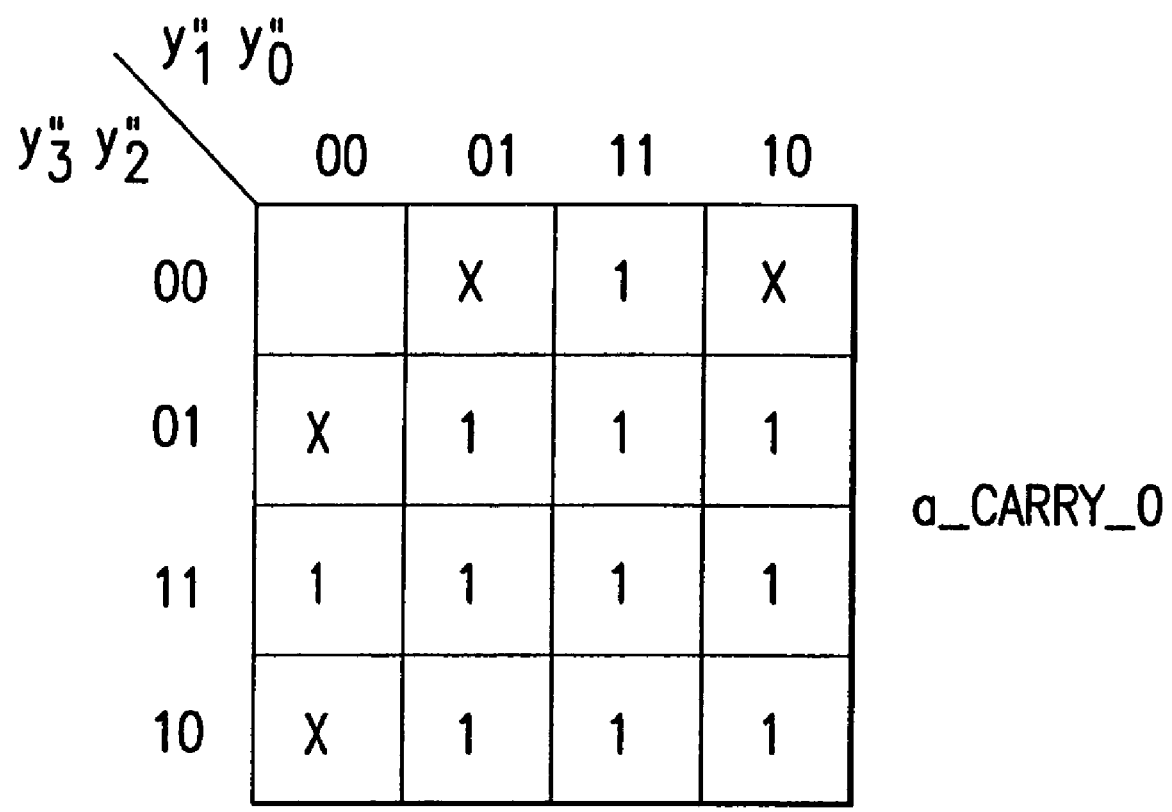
FIG. 15A is Karnaugh map representation for an approximate carry value according to an embodiment of the invention.
Figure 15B:
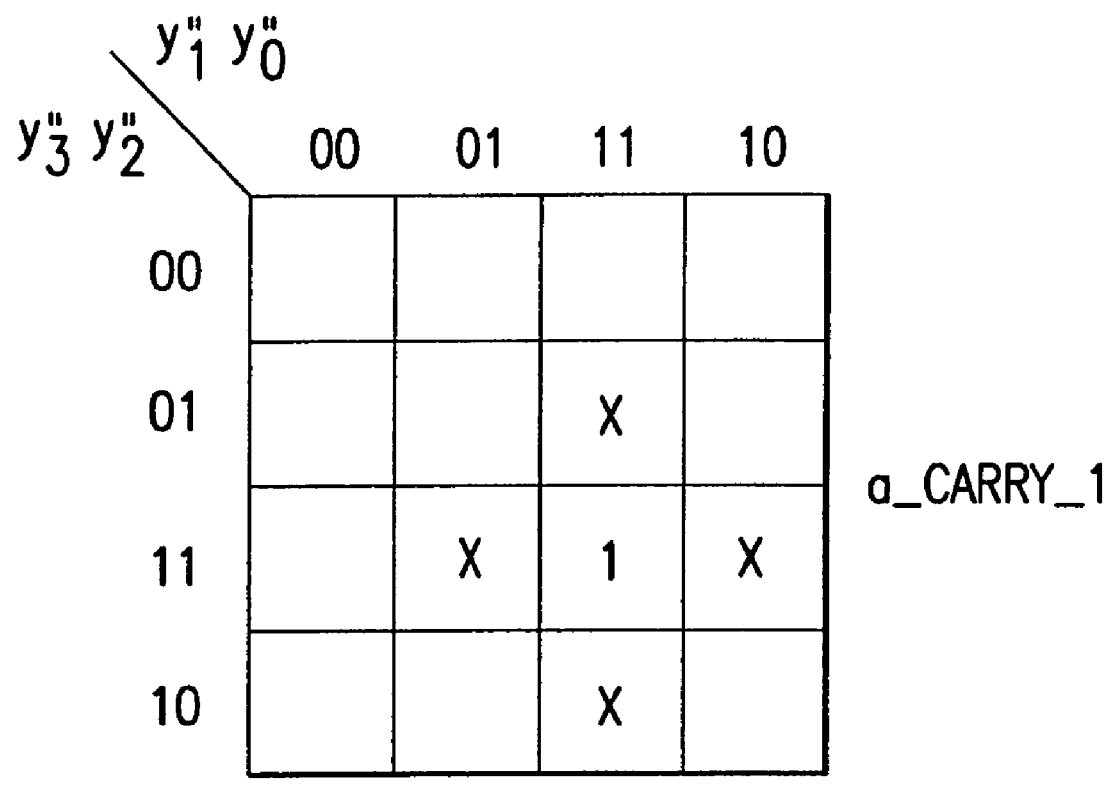
Figure 16A:
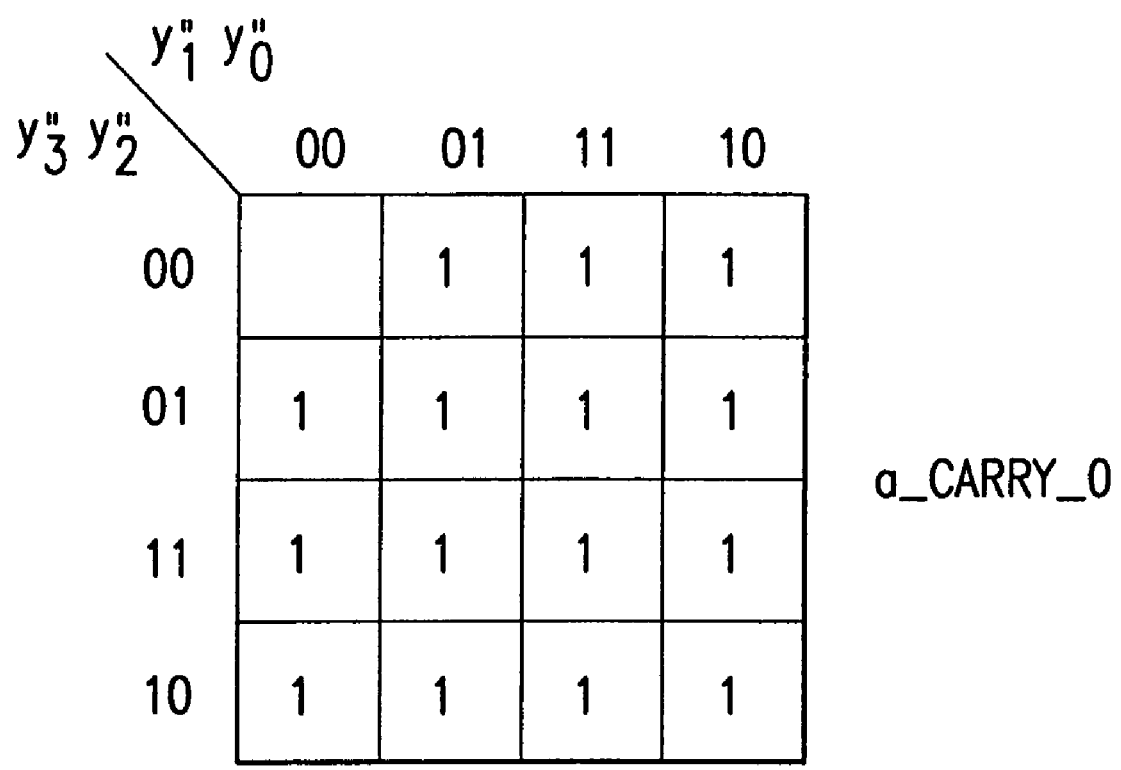
FIG. 16A is Karnaugh map representation for an approximate carry value according to an embodiment of the invention.

As shown in Table VI in FIG. 14, two approximate carry signals (e.g., a_carry_0 and a_carry_1) are needed to represent the rounded values in Table V (see FIG. 13). From Tables V and VI, Karnaugh map representations for the approximate carry signals (a_carry_0 and a_carry_1) can be obtained as shown in FIG. 15A and FIG. 15B. The don't-care conditions (X's) in FIG. 15A and FIG. 15B can be determined using probability analysis. For example, for $y''_3y''_2y''_1y''_0=0001$, $\Pr[x=0]=4/12$ and $\Pr[x=1]=8/12$. Thus the don't-care condition corresponding to $y''_3y''_2y''_1y''_0=0001$ is determined to be 1. In a similar fashion, it can be shown that each don't care condition (i.e., X) in FIG. 15A and FIG. 15B is determined to be 1 by probability analysis. Using the maps in FIG. 16A and FIG. 16B, wherein each don't care condition (i.e., X) is replaced by the value 1, the a_carry_0 and a_carry_1 signals can be obtained as:

a_carry_0=$y''_3\lor y''_2\lor y''_1\lor y''_0$, $a\_carry\_1=y''_3y''_2(y''_1\lor y''_0)\lor y''_1y''_0(y''_3\lor y''_2)$ EQ. (19)

Figure 17:
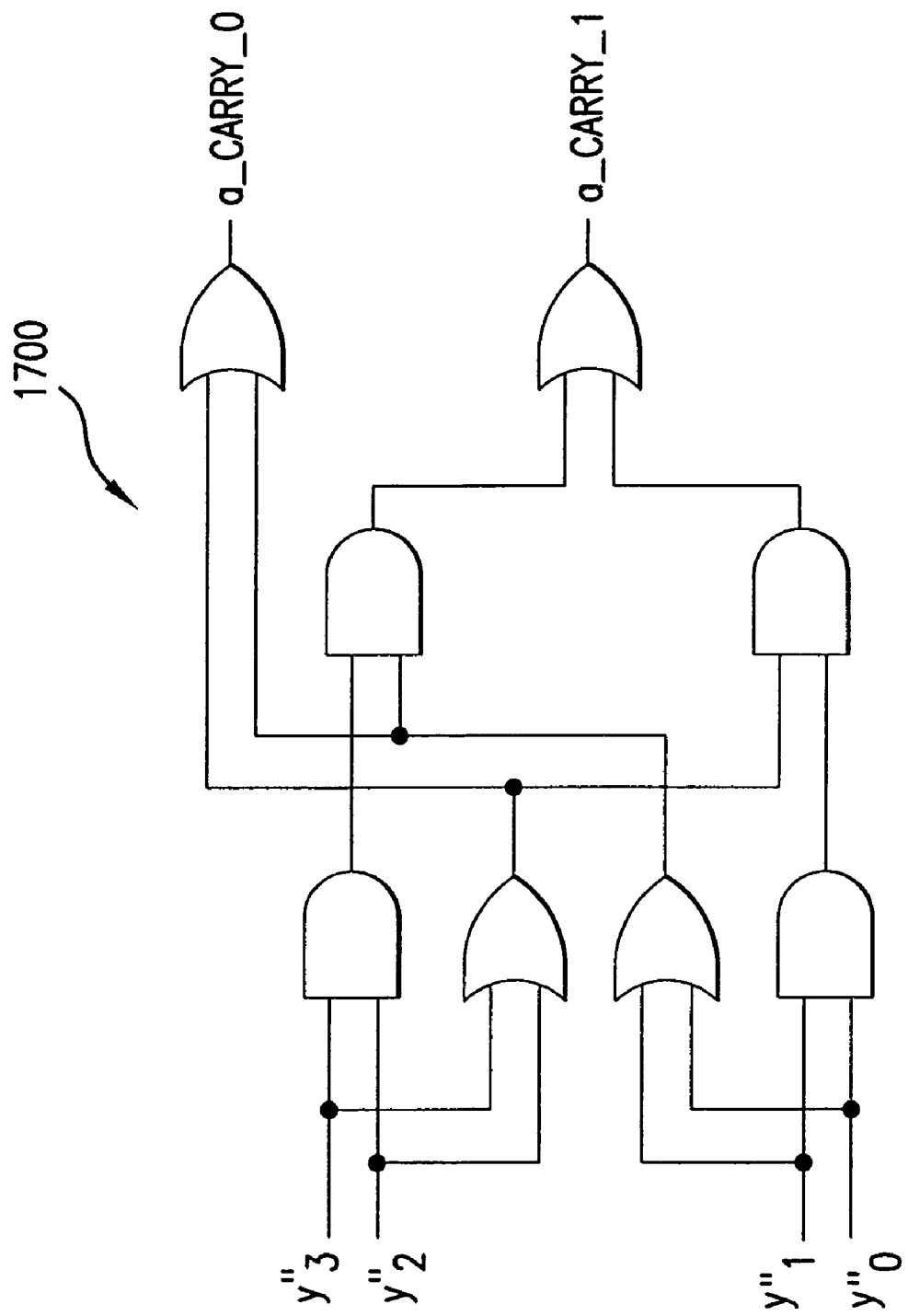
FIG. 17 is an example approximate carry generation circuit according to an embodiment of the invention.

An example circuit 1700 for implementing EQ. (19) is shown in FIG. 17. The approximate carry signals are added to $LP_{major}$. Then, the resulted carry signals from $LP_{major}$ are added to MP as error compensation bias.

Figure 18A:
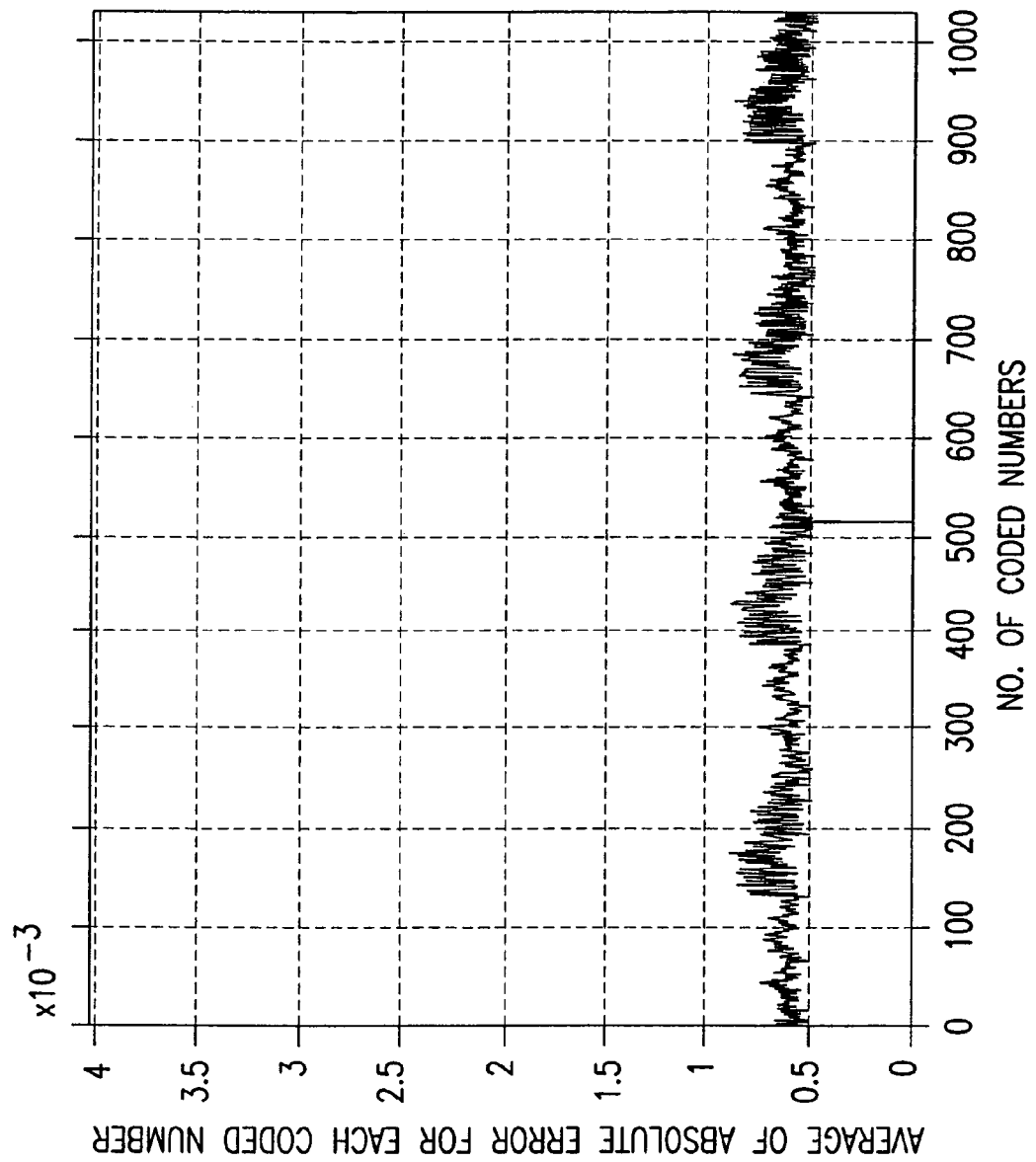
FIG. 18A is a graph illustrating the performance of a modified Booth multiplier according to an embodiment of the invention.
Figure 18B:
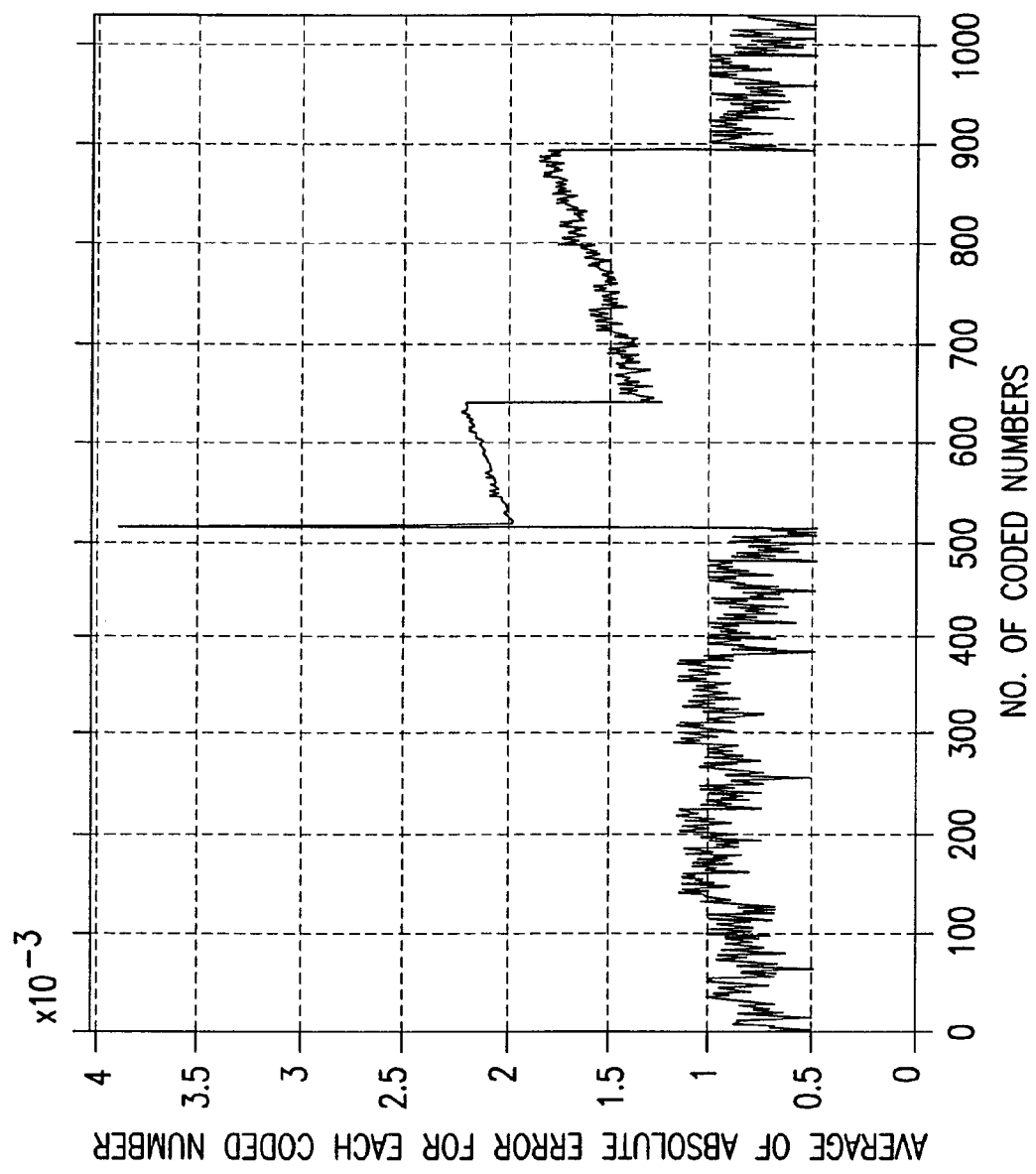
FIG. 18B is a graph illustrating the performance of a conventional modified Booth multiplier.

The enhanced performance of fixed-width multipliers according to embodiments of the invention is demonstrable. Consider, for example, for each 10-bit coefficient of example 1, the average of the absolute quantization error γ (defined as, $=|P_f-P_Q|$) for all the 10-bit input words. FIG. 18A and FIG. 18B illustrate the average error plots obtained by fixed-width multipliers according to embodiments of the invention ($\Phi_{invention}$) and by the fixed-width multiplier of Jou and Wang ($\Phi_{Jou}$), respectively. Table VII in FIG. 19 compares the averages and variances of absolute error for various quantization schemes. Table VIII in FIG. 20 compares the averages and variances normalized by the average and variance of rounding operation. Notice that the average of, by $\Phi_{invention}$ is about fifty percent (50%) of that of $\Phi_{Jou}$.

Approximate Carry Generation by Statistical Analysis

Consider FIG. 9 again. Given that $y''_i$ is 1, using Table I in FIG. 2 and Table III in FIG. 8, it can be shown that $E[p_{ij}]=\tfrac{1}{2}$. If $y''_2y''_1y''_0=100$ in FIG. 9, using EQ. (12), $E[S\_LP'_{minor}]$ is computed as $$E[S\_LP'_{minor}] = E[2^{-1}(p_{2,1})+2^{-2}(p_{2,0}+n_{2,0})],\qquad\text{EQ. (20)}$$
$$= 2^{-1}(2^{-1})+2^{-2}(2^{-1}+2^{-1}),$$
$$= 2^{-1}.$$

In a similar fashion, for $y''_2y''_1y''_0=010$ and $y''_2y''_1y''_0=001$, it can be shown that $E[S\_LP'_{minor}]=2^{-1}$. Thus, for W=8, $E[S\_LP'_{minor}]$ can be expressed as:

$$E[S\_LP'_{minor}]=2^{-1}(y''_2+y''_1+y''_0).\qquad\text{EQ. (21)}$$

For general W, EQ. (21) can be extended and expressed as:

$$E[S\_LP'_{minor}] = 2^{-1}\cdot\sum_{i=0}^{W/2-2} y''_i.\qquad\text{EQ. (22)}$$

To compute the approximate carry, the rounded value of $E[S\_LP'_{minor}]$ needs to be computed. How this is accomplished is further described using Example 2.

EXAMPLE 2

Consider the computation of the rounded value of $E[S\_LP'_{minor}]$ for W=10. Since for W=10, as noted above, $$E[S\_LP'_{minor}]=2^{-1}(y''_3+y''_2+y''_1+y''_0),\qquad\text{EQ. (23)}$$

the maximum rounded value of $E[S\_LP'_{minor}]$ is 2. Thus, two signals are needed to represent the rounded value. If at least one $y''_i$ is 1 in EQ. (23), the rounded value is greater than or equal to 1. If at least three $y''_i$'s are 1, the rounded value is 2. Then, if the notations given in Table VI in FIG. 11 are used, the Karnaugh maps in FIG. 16A and FIG. 16B can be obtained based on the above observations. Thus, the same example approximate carry generation circuit 1700 illustrated in FIG. 17 can be obtained.

Approximate Carry Generation Procedure I (ACGP I)

Figure 21:
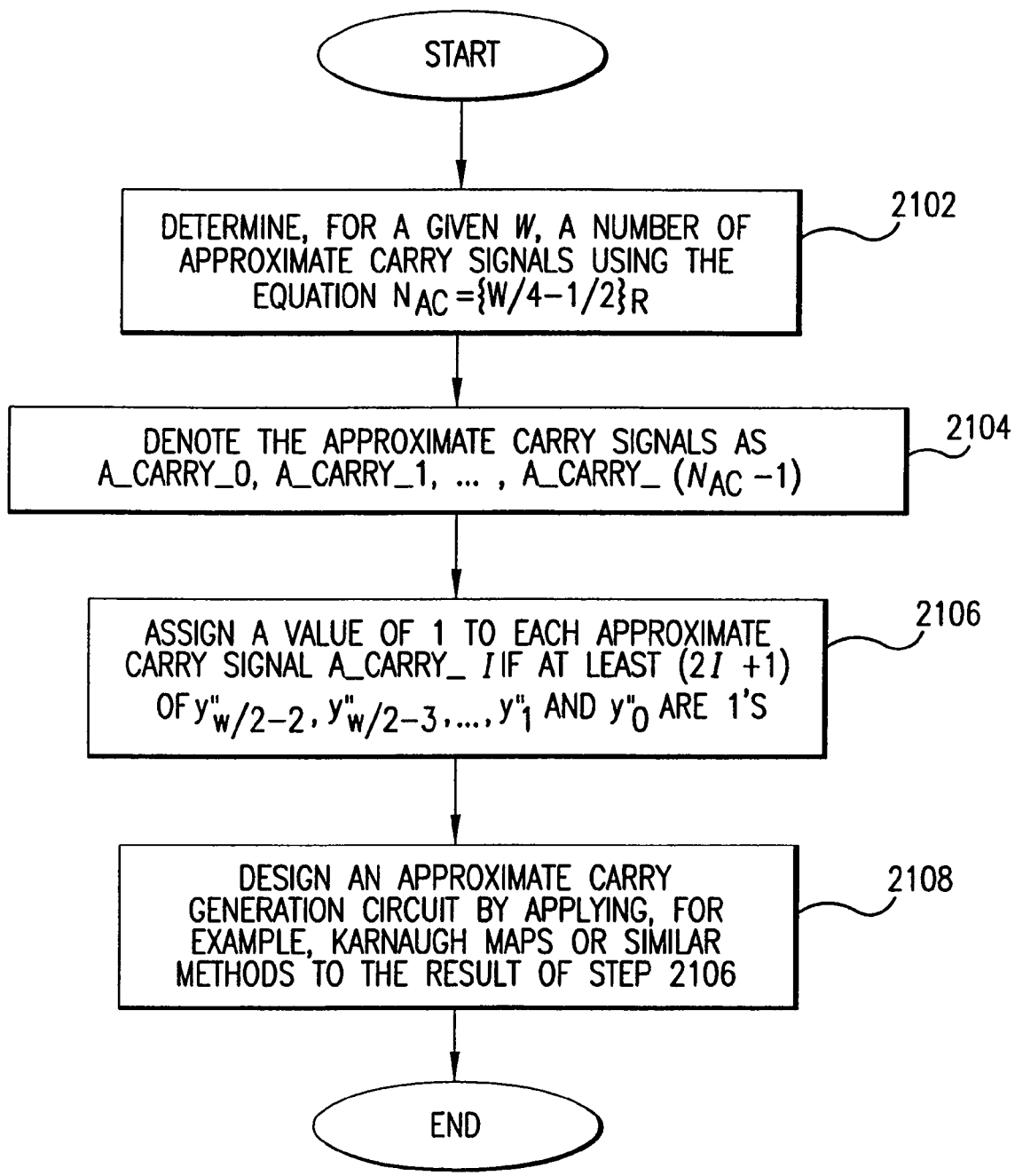
FIG. 21 illustrates a flowchart of the steps of a generalized approximate carry generation procedure I (ACGP I) according to an embodiment of the invention.

FIG. 21 illustrates a flowchart of the steps of a generalized approximate carry generation procedure I (ACGP I) or method 2100 according to an embodiment of the invention. Method 2100 is based on the description of the invention above.

As illustrated in FIG. 21, method 2100 (i.e., ACGP I) comprises four steps 2102, 2104, 2106, and 2108. In step 2102, for a given W, the number of approximate carry signals is determined as $N_{AC}=\{W/4-\tfrac{1}{2}\}_r$. In step 2104, the approximate carry signals are denoted as a_carry_0, a_carry_1, ..., a_carry_($N_{AC}$-1). In step 2106, the value of each approximate carry signal a_carry_i is determined to be 1 if at least (2i+1) of $y''_{w/2-2}, y''_{w/2-3}, \ldots, y''_1$ and $y''_0$ are 1's. In step 2108, by applying, for example, Karnaugh maps or similar methods to the result in step 2106, an approximate carry generation circuit is designed.

How to implement each of the steps of method 2100 as well as the enhanced performance obtained by fixed-width multipliers designed in accordance with method 2100 are described above, and are further illustrated by example 3.

EXAMPLE 3

Consider modified Booth multiplication with W=12. Table IX in FIG. 22 shows the rounded values of $E[S\_LP'_{minor}]$ for all the possible values of $y''_4 y''_3 y''_2 y''_1 y''_0$ obtained by step 2106 of the method 2100. The approximate carry signals can be obtained from Table IX in FIG. 22 as:

$$a\_carry\_0 = y''_4 \lor y''_3 \lor y''_2 \lor y''_1 \lor y''_0,$$

$$a\_carry\_1 = y''_4 \{y''_3 y''_2 \lor y''_1 y''_0 \lor (y''_3 \lor y''_2)(y''_1 \lor y''_0)\} \lor y''_3 y''_2 (y''_1 \lor y''_0) \lor (y''_3 \lor y''_2) y''_1 y''_0$$

$$a\_carry\_2 = y''_4 y''_3 y''_2 y''_1 y''_0. \quad \text{EQ. (24)}$$

Table X in FIG. 23 compares the averages and variances of absolute error for various quantization schemes. Notice again that the average of, by $\Phi_{invention}$ is about fifty percent (50%) of that of $\Phi_{Jou}$.

Larger word-length fixed-width modified Booth multipliers can be designed using the generalized approximate carry generation procedure (ACGP I) described herein. The design results for W=16 and W=20 are summarized in Table XI in FIG. 24 and Table XII in FIG. 25, respectively.

Table XIII in FIG. 26 and Table XIV in FIG. 27 show Synopsys simulation results for area and power consumption for W=10 and W=12 designs, respectively. As illustrated in Tables XIII and XIV, by using fixed-width multipliers according to the present invention, area and power consumption of modified Booth multipliers can be reduced by about thirty-five percent (35%) compared to conventional modified Booth multipliers. Notice that while there are only small differences in area and power consumption between a fixed-width multiplier according to the invention and a fixed-width multiplier according to Jou and Wang, the differences in the quantization error are significant.

Approximate Carry Generation Procedure II (ACGP II)

For large W, the Karnaugh map design approach described above may become complex. In addition, the critical path computation time of the approximate carry generation circuit increases as W increases. Notice that $$\sum_{i=0}^{N_{AC}-1} a\_carry\_i = \left\{ \sum_{i=0}^{W/2-2} \frac{y''_i}{2} \right\}_r. \quad \text{EQ. (25)}$$

Thus, to simplify the design of an implementing circuit for large W, the following approximate carry generation procedure II (ACGP II) or method 2800 can be used.

Figure 28:
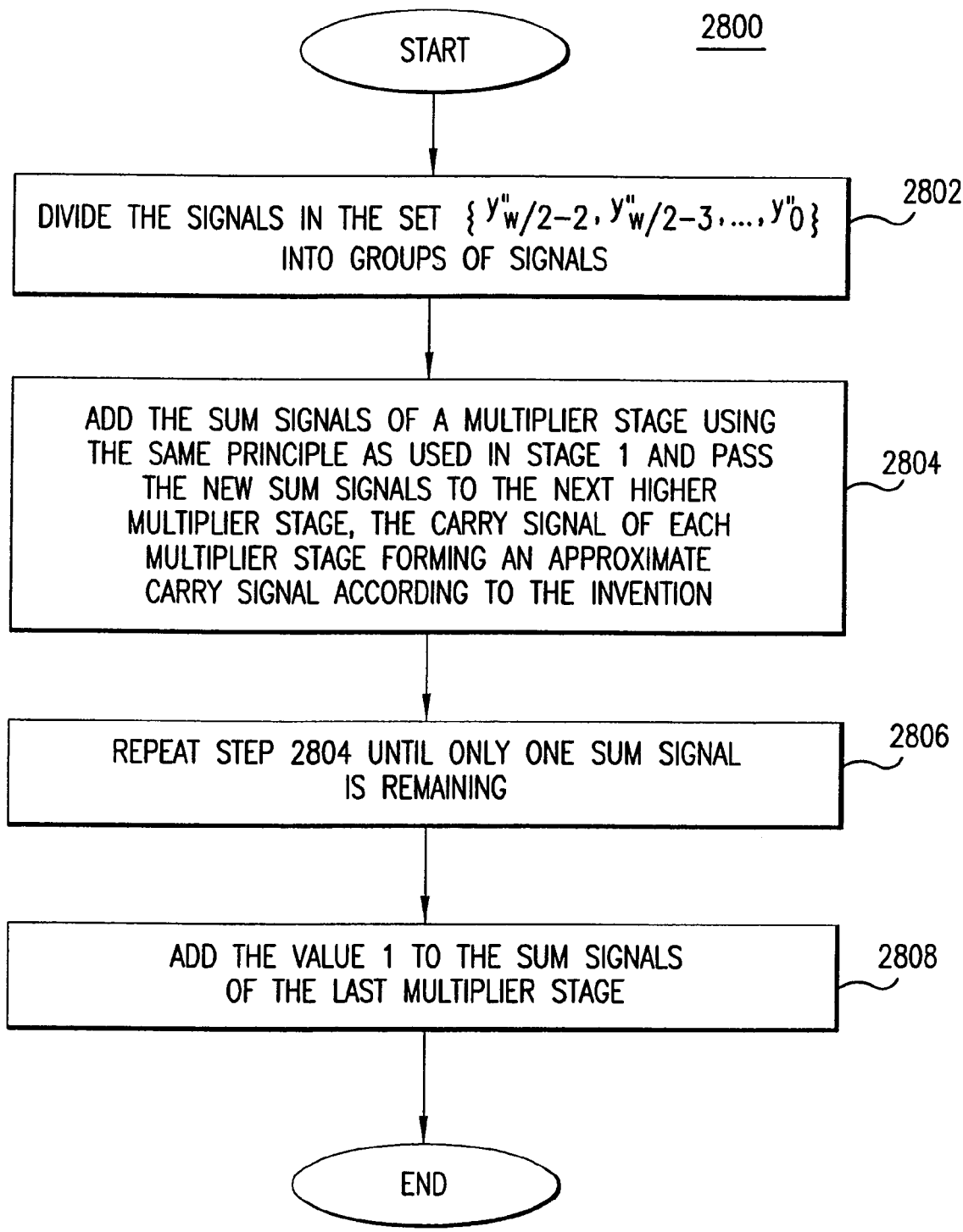
FIG. 28 illustrates a flowchart of the steps of a generalized approximate carry generation procedure II (ACGP II) according to an embodiment of the invention.

FIG. 28 is a flowchart of the steps of a generalized approximate carry generation procedure II (ACGP II) or method 2800. Method 2800 is based on the description of the present invention herein and EQ. (25). As illustrated in FIG. 28, method 2800 comprises four steps 2802, 2804, 2806, and 2808.

In step 2802, the signals in the set $\{y''_{w/2-2}, y''_{w/2-3}, \ldots, y''_0\}$ are divided into groups of three signals. If the number of signals in the set is 3N+l (l=1, 2), the last group contains only l signals. The 3N signals are added using N full adders (FA's). For l=2, the two signals in the last group are added using a half adder (HA). For l=1, the signal in the last group is passed to the next stage. The N (or N+1 for l=2) carry signals from each adder are approximate carry signals.

In step 2804, the sum signals generated in stage 1, are added using the same principle as in stage 1. The carry signals from each adder are approximate carry signals. The new sum signals are passed to the next stage.

In step 2806, the procedure of step 2804 is repeated until only one sum signal is remaining. The total number of adders used should be $N_{AC}$ and consequently the total number of approximate carry signals is $N_{AC}$.

In step 2808, the value 1 is added to the last adder. The addition of "1" can be done efficiently using the schemes illustrated in FIG. 29A and FIG. 29B.

Table XV in FIG. 30 shows a comparison of the approximate carry signals generated in accordance with ACGP I (i.e., method 2100) and ACGP II (i.e., method 2800) for W=8. Notice that the sum of the approximate carry signals generated by ACGP I is equal to the sum of the approximate carry signals generated by ACGP II.

Figure 31B:
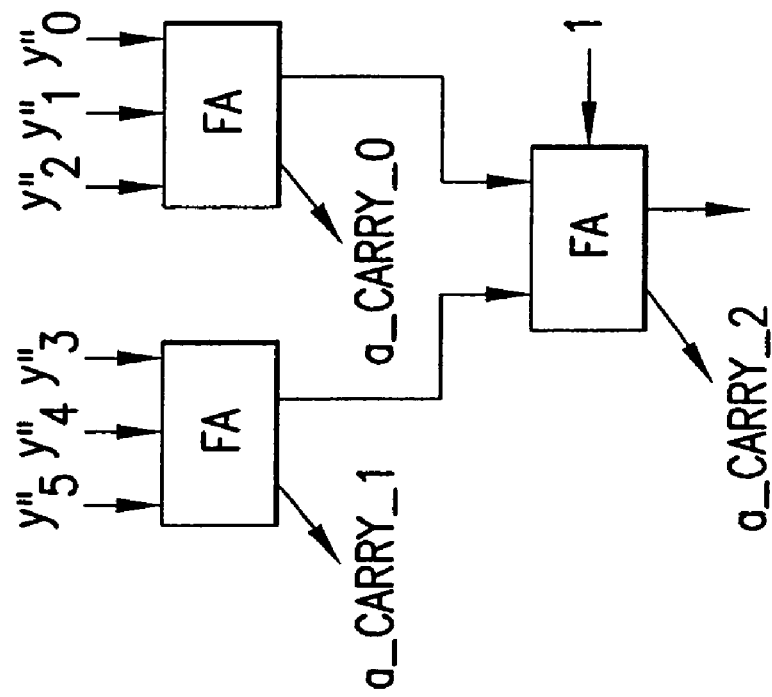
FIG. 31B illustrates an example approximate carry generation circuit according to an embodiment of the invention.
Figure 31A:
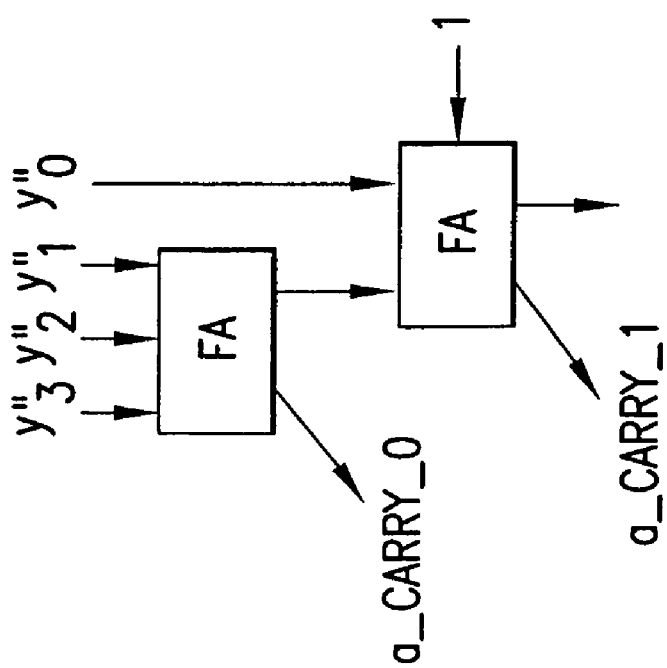
FIG. 31A illustrates an example approximate carry generation circuit according to an embodiment of the invention.

FIG. 31A and FIG. 31B illustrate approximate carry generation circuits designed according to ACGP II. FIG. 31A illustrates an approximate carry generation circuit for W=10. FIG. 31B illustrates an approximate carry generation circuit for W=14. Notice that the last adders in FIG. 31A and FIG. 31B can be simplified using the schemes illustrated in FIG. 29A and FIG. 29B.

Table XVI in FIG. 32 compares Synopsys simulation results of ACGP I and ACGP II for various W values. Notice that ACGP II can be used to achieve better results if W is greater than or equal to 12.

CONCLUSION

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for fixed-width modified Booth multiplication, comprising:
   generating partial products for a W-bit multiplier encoded using modified Booth coding and a multiplicand; and
   accumulating the partial products to form a W-bit product, wherein said accumulating step comprises
      dividing truncated bits into two groups, $LP_{MAJOR}$ and $LP_{MINOR}$, wherein LP is least significant product,
      generating an approximate carry value using the bits of $LP_{MINOR}$ with a circuit that
         produces a pre-selected number ($N_{AC}$) of approximate carry signals (a_carry_0, a_carry_1, ..., a_carry_$N_{AC-1}$), wherein an approximate carry signal (a_carry_i) has a value of 1 if at least "2i+1" of a plurality of coded values $y''_{w/2-2}, y''_{w/2-3}, \ldots, y''_1$ and $y''_0$ have a value of 1, and generating an exact carry value for $LP_{MAJOR}$ using the approximate carry value and the bits of $LP_{MAJOR}$.

2. The method of claim 1, wherein said accumulating step comprises:
accumulating more than W most significant bits; and
truncating the result to W-bits.

3. The method of claim 1, wherein said accumulating step comprises:
accumulating more than W most significant bits; and
rounding the result to W-bits.

4. The method of claim 1, wherein said accumulating step comprises:
accumulating exactly W most significant bits.

5. A fixed-width modified Booth multiplier, comprising:
a module that processes a W-bit multiplier encoded using modified Booth coding and a multiplicand to generate partial products; and
a module that accumulates the partial products to form a W-bit product,
wherein said module that accumulates comprises a circuit that generates an approximate carry value using bits of a bit group $LP_{MINOR}$ wherein LP is least significant product, with a sub-circuit that
produces a pre-selected number ($N_{AC}$) of approximate carry signals (a_carry_0, a_carry_1, . . . , a_carry_$N_{AC-1}$),
wherein an approximate carry signal (a_carry_i) has a value of 1 if at least "2i+1" of a plurality of coded values $y''_{w/2-2}, y''_{w/2-3}, \ldots, y''_1$ and $y''_0$ have a value of 1.

6. The multiplier of claim 5, wherein the module that accumulates comprises:
a plurality of adder circuits used to generate the approximated carry value.

7. The multiplier of claim 5, wherein the module that accumulates accumulates more than W most significant bits; and truncates the result to W-bits.

8. The multiplier of claim 5, wherein the module that accumulates accumulates more than W most significant bits; and rounds the result to W-bits.

9. The multiplier of claim 5, wherein the module that accumulates accumulates exactly W most significant bits.

10. A multiplier, comprising:
a circuit that accumulates partial products to generate a product, the circuit comprising
a first sub-circuit that associates truncated bits with a bit group $LP_{MAJOR}$ or a bit group, $LP_{MINOR}$ wherein LP is least significant product,
a second sub-circuit that generates an approximate carry value using the bits associated with the bit group $LP_{MINOR}$, wherein the second sub-circuit produces a pre-selected number ($N_{AC}$) of approximate carry signals (a_carry_0, a_carry_1, . . . , a_carry_$N_{AC-1}$),
wherein an approximate carry signal (a_carry_i) has a value of 1 if at least "2i+1" of a plurality of coded values $y''_{w/2-2}, y''_{w/2-3}, \ldots, y''_1$ and $y''_0$ have a value of 1, and
a third sub-circuit that generates an exact carry value using the approximate carry value and the bits associated with the bit group $LP_{MAJOR}$.

11. The multiplier of claim 10, wherein an output of a Booth encoder is used to generate the approximate carry value.

12. The multiplier of claim 10, wherein a plurality of adder circuit carry signals are used to generate the approximate carry value.

13. The multiplier of claim 10, wherein the circuit accumulates more than W-bits and truncates the result to W-bits.

14. The multiplier of claim 10, wherein the circuit accumulates more than W-bits and rounds the result to W-bits.

15. The multiplier of claim 10, wherein the circuit accumulates exactly W-bits.

* * * * *